United States Patent [19]
Phlipot

[11] Patent Number: 5,982,643
[45] Date of Patent: *Nov. 9, 1999

[54] POWER CONVERTER WITH SELECTIVELY VARIABLE OUTPUT AND CONTROLLER AND DISPLAY SYSTEM THEREFOR

[75] Inventor: Thomas H. Phlipot, Jackson, Mich.

[73] Assignee: Progressive Dynamics, Inc., Marshall, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/729,053

[22] Filed: Oct. 10, 1996

[51] Int. Cl.$^6$ .................................................. H02M 3/337
[52] U.S. Cl. ............................... 363/25; 363/98; 323/351; 323/909; 320/149
[58] Field of Search .................. 363/39–43, 26, 363/97–98, 25; 323/351, 322, 909; 320/149, 160, 162

[56] References Cited

U.S. PATENT DOCUMENTS

| | | | |
|---|---|---|---|
| 3,678,368 | 7/1972 | Popp | 321/11 |
| 4,073,003 | 2/1978 | Chambers | 363/20 |
| 4,151,387 | 4/1979 | Peters, Jr. | 219/10.49 R |
| 4,499,385 | 2/1985 | Slavik | 307/10 R |
| 4,564,896 | 1/1986 | Akerson | 363/56 |
| 4,617,472 | 10/1986 | Slavik | 307/10 R |
| 4,694,193 | 9/1987 | Schlenk et al. | 307/62 |
| 4,742,441 | 5/1988 | Akerson | 363/97 |
| 4,820,966 | 4/1989 | Fridman | 320/32 |
| 4,871,957 | 10/1989 | Taranto et al. | 320/26 |
| 5,034,871 | 7/1991 | Okamoto et al. | 363/15 |
| 5,155,672 | 10/1992 | Brown | 363/43 |
| 5,331,268 | 7/1994 | Patino et al. | 320/20 |
| 5,351,283 | 9/1994 | Kunitomo | 379/58 |
| 5,440,221 | 8/1995 | Landau et al. | 320/22 |
| 5,457,624 | 10/1995 | Hastings | 363/127 |
| 5,600,550 | 2/1997 | Cook, II | 363/50 |
| 5,623,197 | 4/1997 | Roseman et al. | 320/61 |
| 5,625,279 | 4/1997 | Rice et al. | 323/283 |
| 5,670,861 | 9/1997 | Nor | 320/15 |
| 5,680,031 | 10/1997 | Pavlovic et al. | 320/21 |
| 5,687,066 | 11/1997 | Cook, II | 363/89 |
| 5,736,831 | 4/1998 | Harrington | 320/39 |

OTHER PUBLICATIONS

Todd Engineering Sales Inc. Publication (One Page).

*Primary Examiner*—Peter S. Wong
*Assistant Examiner*—Derek J. Jardieu
*Attorney, Agent, or Firm*—Price, Heneveld, Cooper, DeWitt & Litton

[57] ABSTRACT

A system to control the output voltage of a power converter in response to a specific load battery condition. The system contains a power converter, a TCMS interface attached thereto and a controller for selectively and/or adaptably changing the magnitude of converter output voltage. A control module is incorporated in the system to automatically change converter output voltage up or down in response to the load (input) voltage. The module contains a microcontroller to sense the battery (input) voltage process said input voltage with an analog-to-digital converter. The microcontroller is programmed to execute a series of routines to determine the proper charging voltage for the system. Thereafter, the control module communicates this information through the interface of the power converter to cause the power converter to charge at the optimum voltage. In the alternative, a plug-in component containing passive circuitry may be used to manually signal the power converter to charge at a predetermined voltage.

49 Claims, 29 Drawing Sheets

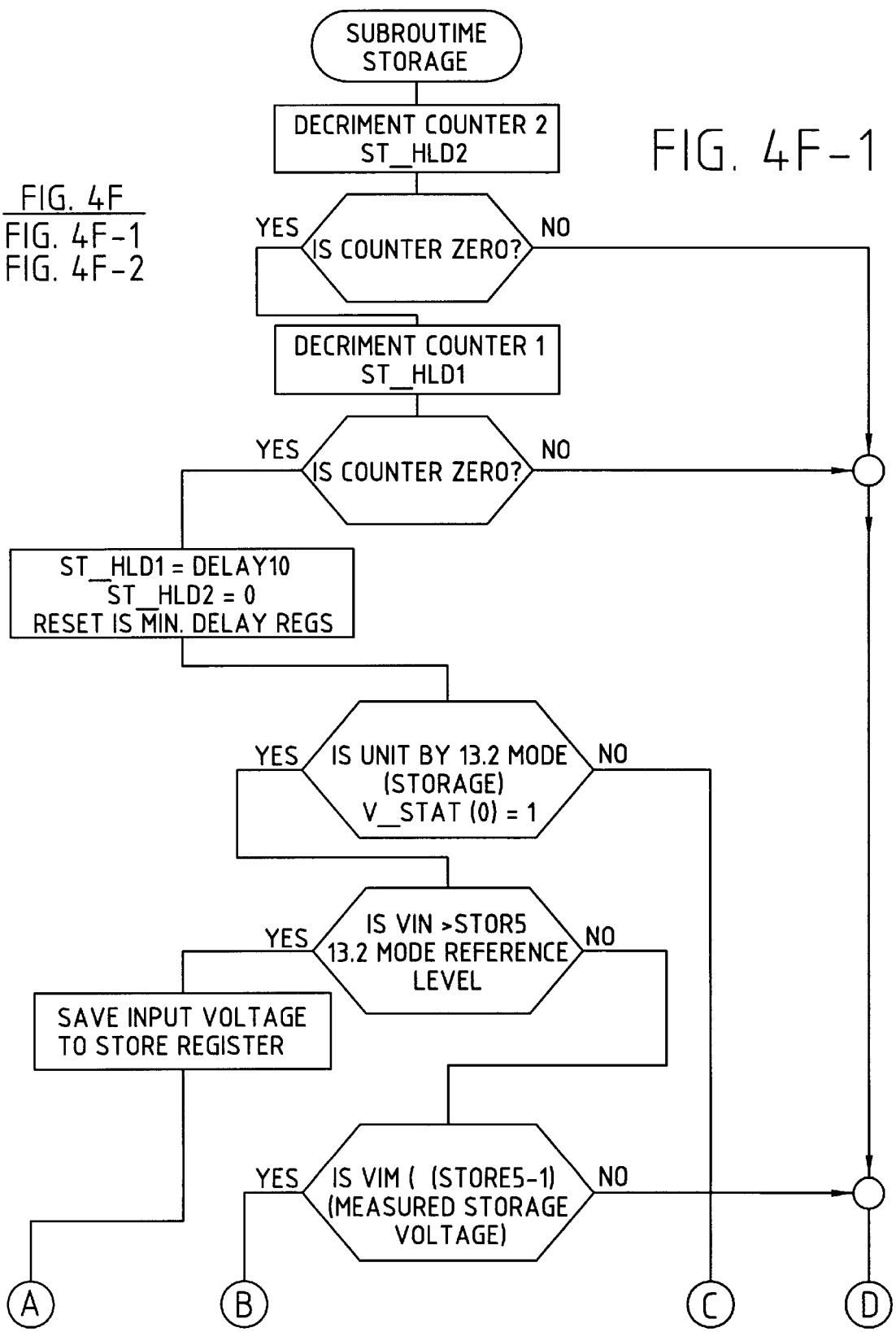

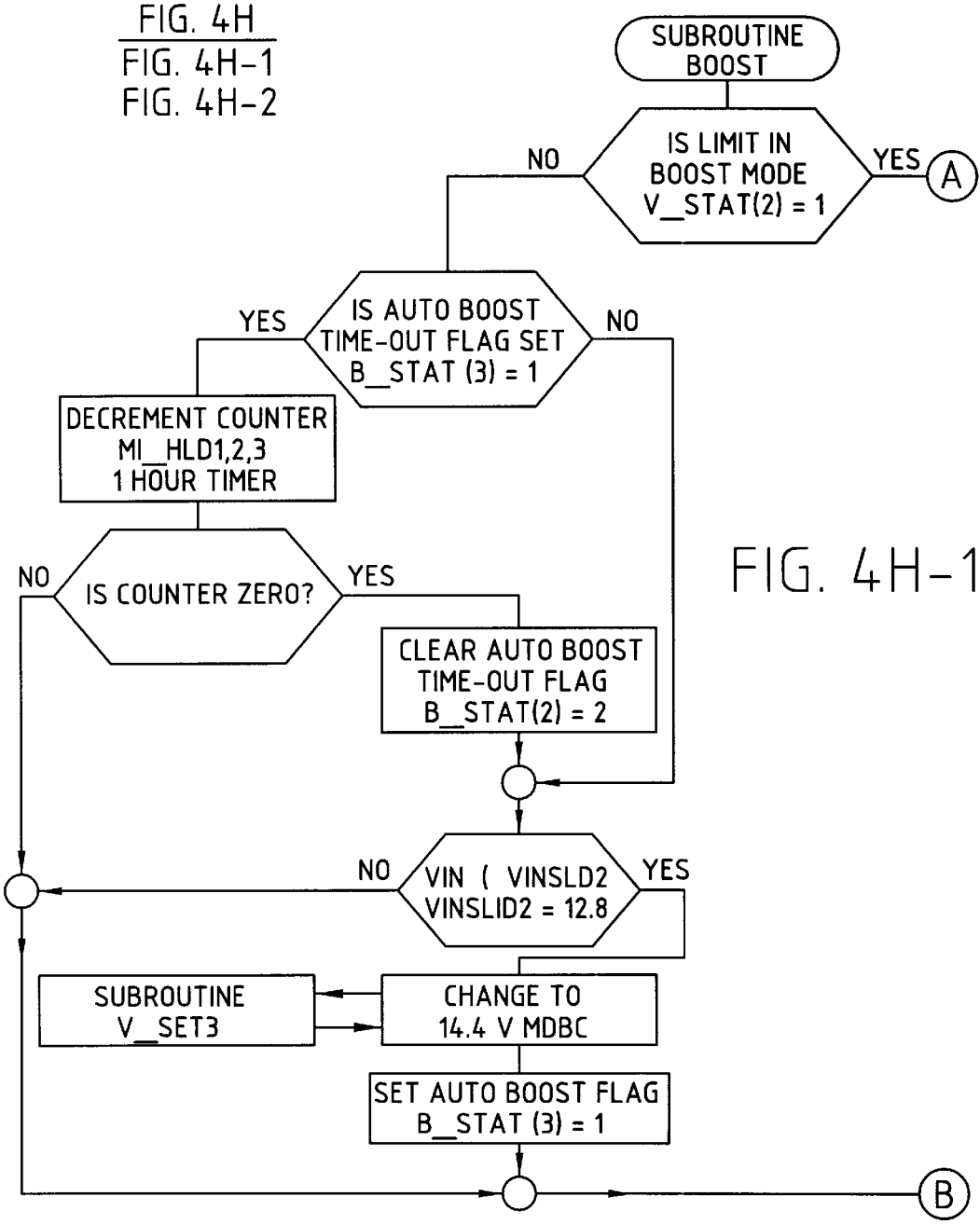

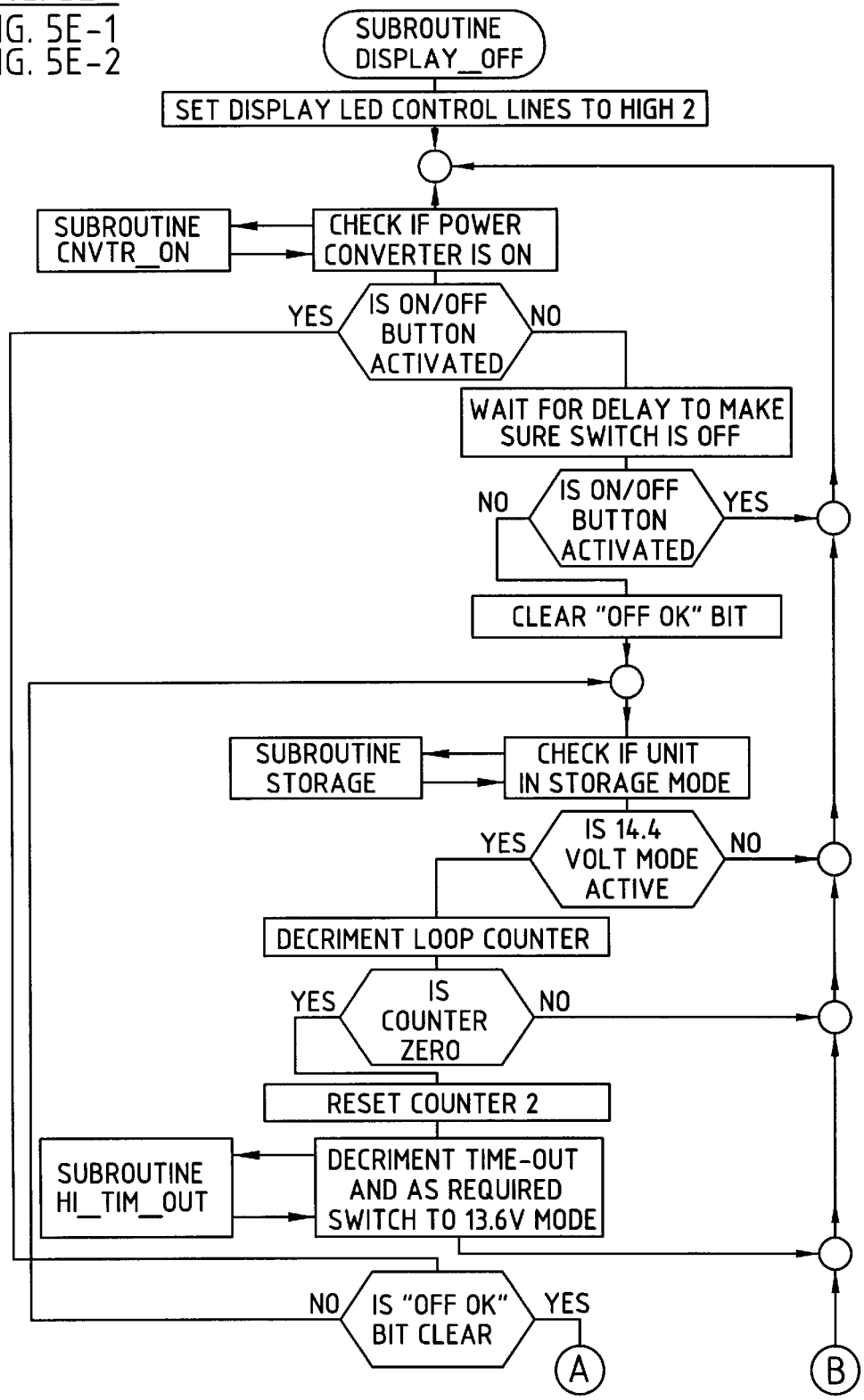

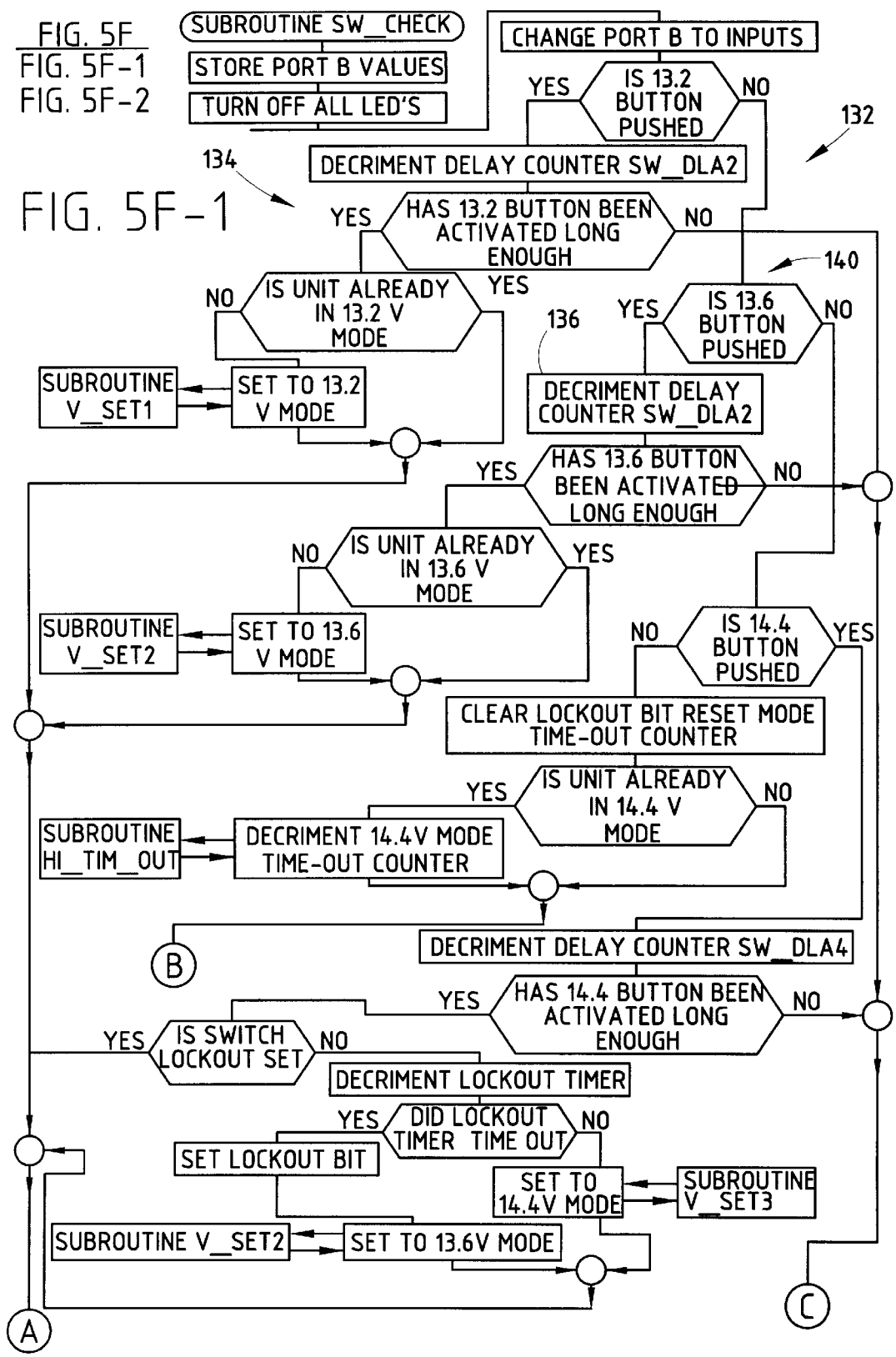

POWER CONVERTER WITH SELECTIVELY VARIABLE OUTPUT AND CONTROLLER AND DISPLAY SYSTEM THEREFOR

BACKGROUND OF THE INVENTION

The present invention relates in general to electric power supplies and more particularly power converters; more specifically still, it relates to an interface and controller for selectively and/or adaptively changing the magnitude of converter output voltage.

Power converters for converting AC power to a regulated DC level are well-known and widely used in a variety of applications, one important such application being recreational vehicles (e.g., boats, motorhomes, etc.). Low-cost power converters typically comprise a rectifier and DC voltage regulator which controls the output voltage to be near some pre-determined level under optimum or standard operating conditions. However, the output voltages of these power converters is subject to substantial variation and instability which limits their success as well as their range of applications. Accordingly, relatively costly DC motors, which operate properly with a power supply which is not stable, must sometimes be used in recreational vehicles if low-cost DC voltage regulators are employed and an even more significant adverse effect is the overall battery-charging performance and characteristics of such systems, which often overcharge and/or undercharge, thereby shortening operating life and causing defective performance.

An alternative to such DC voltage regulators are switched power converters. Switched power converters have a more stable output voltage but the switching power circuitry required to produce the more stable output voltage is costly. In addition, even these more expensive converters do not necessarily provide the most optimum battery-charging and often do not maintain performance since their outputs are not adaptive to changing conditions and therefore sometimes exceed or fail to meet particular requirements and conditions encountered. For instance, a 13.6 volt battery charge level may at times be too high and damage the battery while at other times it will be insufficient to charge a battery as rapidly as desired. Therefore, a need has arisen for power converters capable of outputting various voltages, and a means for controlling these operating voltages in accordance with actual conditions encountered.

Having the capability of operating over a range of voltages is desirable because, at certain times, the user will need to charge the battery faster. Increasing output voltage will prevent electrolyte stratification and reduce sulfation, thus extending both the life and capacity of the battery. In addition, increasing output voltage will improve performance of load items such as power slide-outs. On the other hand, decreasing converter output voltage slightly will reduce water boil-off in the battery and, therefore, limit maintenance and extend operating life. Further, decreasing output voltage will reduce the current that the converter draws from the AC line. This will help keep the load current of the main RV power cord below its maximum capacity when other loads, such as an air conditioner, turn on.

The problem with respect to the draw on the load current is that it has steadily increased as more and more loads (such as power slide-outs) are added to these vehicles. As a result, higher capacity converters have become necessary. Now, at full power, the converter itself draws 11 to 12 amps and although most load devices are wired for 30-amp service, the newer bus-type vehicles require 50-amp service. Therefore, some converter designs try to deal with this problem by using circuitry which limits their allowable draw on load current, while others turn the converter off when the battery is at least minimally charged and then later turn the converter back on. However, this obviously provides unsatisfactory overall performance and is not likely to properly charge and maintain the associated vehicle/coach batteries. Therefore, some converters have now been designed to effectively turn off under certain conditions by reducing their output voltage to a very low level. In one such design, the converter has a dual-voltage terminal such that if the two contacts on the terminal are shorted, the output goes to a predetermined maximum level and, if left open, the output goes to a predetermined minimum level. This design contains a toggle switch which allows the user to manually control the high and low output level as desired. In another embodiment of this system, an electronic module attached to the converter reads the battery voltage and automatically responds by signaling the converter to increase or decrease the charging voltage. For example, if it has been "high" for a predetermined time, the output voltage will automatically drop to the lower voltage.

Overall, the functions of such a device are limited. For instance, in the former embodiment, if the user toggles the switch "high" and forgets, he could burn up his battery because the design lacks a safety feature. Furthermore, this device is built directly into the converter, making the converter itself more expensive. In addition, the particular levels are set by the factory, and only two specific values are available to the user. Consequently, there is no real versatility to the design, and no way for the user to readily or conveniently select an output level different than those built-in at the factory. Further, in the latter embodiment, the device does not allow for manual control by switching between high and low voltage levels. Another problem with this embodiment is that the external module cannot be utilized with older models of the converter unless the converter is retrofitted with a dual-voltage terminal.

SUMMARY OF THE PRESENT INVENTION

The present invention overcomes the disadvantages of the prior art power supplies and converters noted above by providing a system to increase or decrease output voltage in response to a specific load battery e.g., condition, or operator demand. The system of the invention includes an interface which imposes a selectable command signal or communicates a control signal derived from the load battery voltage, e.g., to the power converter, by which converter output is either manually or automatically raised or lowered, and by which multiple output voltages and related battery conditions may be provided.

According to one aspect of the invention, an optional module is coupled to the interface and to a load, in particular a vehicle battery, and operates to automatically change converter output voltage up or down in response to the load (input) voltage. The module uses a microcontroller to sense an outside stimulus such as the battery voltage. In addition, the microcontroller contains an analog-to-digital converter to process the input voltage. When power is applied to the external module, the system will initialize and the converter will begin to charge in Normal Mode; i.e., the converter will charge at the standard 13.6 volt level. Then, if the battery voltage changes, the microcontroller will detect the change, process it and output the requisite control signal which is transmitted via the interface to the converter.

According to further aspects of the invention, when the interface to the power converter receives a signal from the control module to enter "Boost" mode, the converter output is forced to 14.4 volts until the battery is charged to a predetermined level, e.g., approximately 14.0 volts, or for a specific time, or both. This mode may be entered in one of three ways. First, it can be triggered by manually activating a "Boost" switch. Alternatively, the Boost Mode will be triggered automatically by a series of subroutines in a control program stored in the memory of the microcontroller if the system voltage drops below a predetermined level, or if the unit is coming out of "Storage" mode (described below). Whenever the Boost Mode is so activated, the converter will return to Normal Mode after a maximum predetermined period (e.g., eight hours in automatic Boost, or four hours in manual or exit-storage Boost) or at any time the system voltage exceeds 14.0 volts for four hours. In addition, if the Boost switch becomes shorted or is pressed for an extended period of time, the module will ignore the switch and signal the converter to resume Normal Mode operation while all other Auto Boost features will still be functional.

According to another aspect of the invention, the module can place the converter in a "Trickle" mode, in which the module forces the converter output to a lower voltage, e.g., 13.2 volts. In a preferred example, the Trickle Mode is automatically activated during the "storage" mode which the module will activate at any time the system voltage remains constant for four consecutive periods of 6 hours each. When in Storage Mode, the converter will be set to charge at 13.2 volts, the same output level triggered in Trickle Mode. If the system voltage should then decrease within a 15-minute interval, the module will cause the converter to exit the Storage Mode and change to the Boost Mode. This operation will "wake up" the battery before resuming normal operation.

According to a further aspect of the invention, an alternate embodiment of the module includes manual control switches for each mode of operation: Trickle, Normal and Boost Modes. In addition, the control program stored in the memory of the microcontroller includes subroutines to control further aspects of the invention. For instance, the subroutine which checks the Boost Mode switch in the first embodiment preferably includes instructions to check the switches for all modes of operation. Also, the control program preferably incorporates subroutines to control an LED display and aid in diagnosing abnormal conditions.

According to a further aspect of the invention, the voltage level controller of the system is adapted to be implemented as a unit which is physically distinct from the converter but which is connected to it and may be located either close to (e.g., directly at) the converter, or at a different location, for example, one which affords easy access to the user. A "plug-in" type device is preferably utilized to connect the module to the converter. Therefore, the cost of the modular control capability is kept low while its flexibility of usage is increased. If the vehicle manufacturer wishes to provide the feature in one or more of its possible configurations, he may do so as an option, or if the end customer wants to upgrade by adding the apparatus or changing its configuration, this can very easily be done at any time. In a relatively simple but very useful and effective example, such a "plug-in" device may simply comprise a plug-like member which incorporates resistive and/or other such voltage level-modifying circuitry by which an internal bias or other output-control voltage is provided and applied to the converter to cause its output to be at some particular selected voltage level, e.g., one required to operate a particular accessory or other user device. Such a plug may thus simply be inserted into a socket provided on the converter itself (or at some other convenient location), to cause the converter output to immediately change to the desired level. Many different such "plugs" could be provided for selective interchange to obtain different converter output levels.

According to a still further aspect of the invention, the control module may provide a control input to the converter based partially or totally upon other monitored parameters such as the amount of current being drawn from the primary AC line supplying the recreational vehicle or other such user facility employing the converter. In this manner, the converter output may be controlled in response to or as a function of the magnitude of such current draw, e.g., by changing the converter output in a predetermined and corresponding manner or by turning the converter off during periods of AC line current draw exceeding an assigned threshold, thereby better managing overall power consumption and decreasing the likelihood of inadvertent component stress and resultant failure, while also increasing overall safety, etc.

These and other aspects, features and advantages of the present invention will be better understood after reading the following detailed description of preferred embodiments, together with reference to the accompanying drawings, in which the invention is disclosed in conjunction with a preferred form of converter (more particularly identified hereinafter) with which it is particularly well adapted for operation.

DETAILED DESCRIPTION OF THE PREFERRED EMBODIMENT

It will become apparent to those skilled in the art that various modifications to the preferred embodiments of the invention as described herein can be made without departing from the spirit or scope of the invention.

Figures 1, 2:
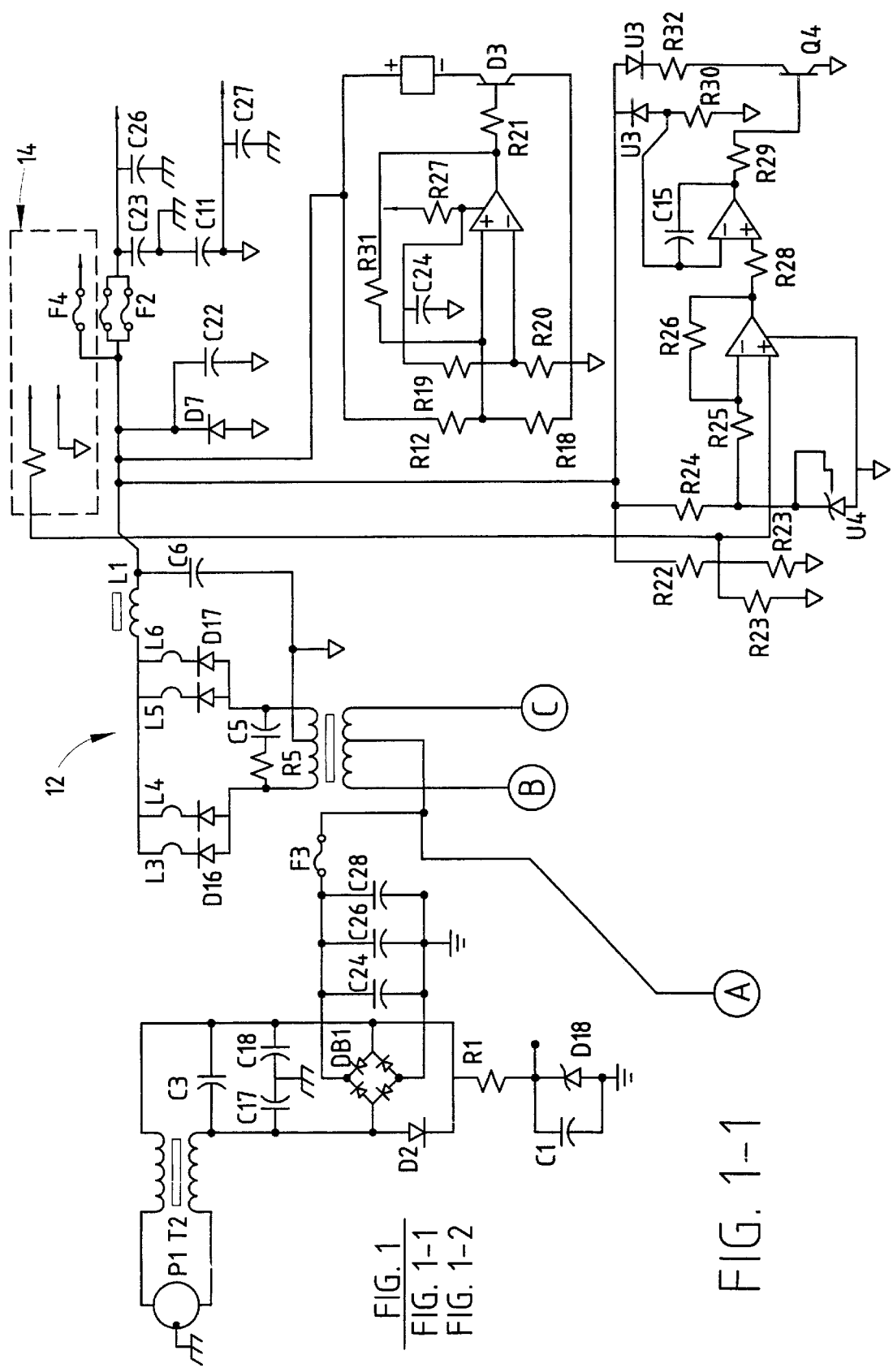
FIG. 1 is a schematic circuit diagram of a preferred power converter circuit, showing the external circuitry of the remote controller interface.
FIG. 2 is a schematic view of a preferred control module which includes a microcontroller, according to one embodiment of the invention.
Figures 1, 2:
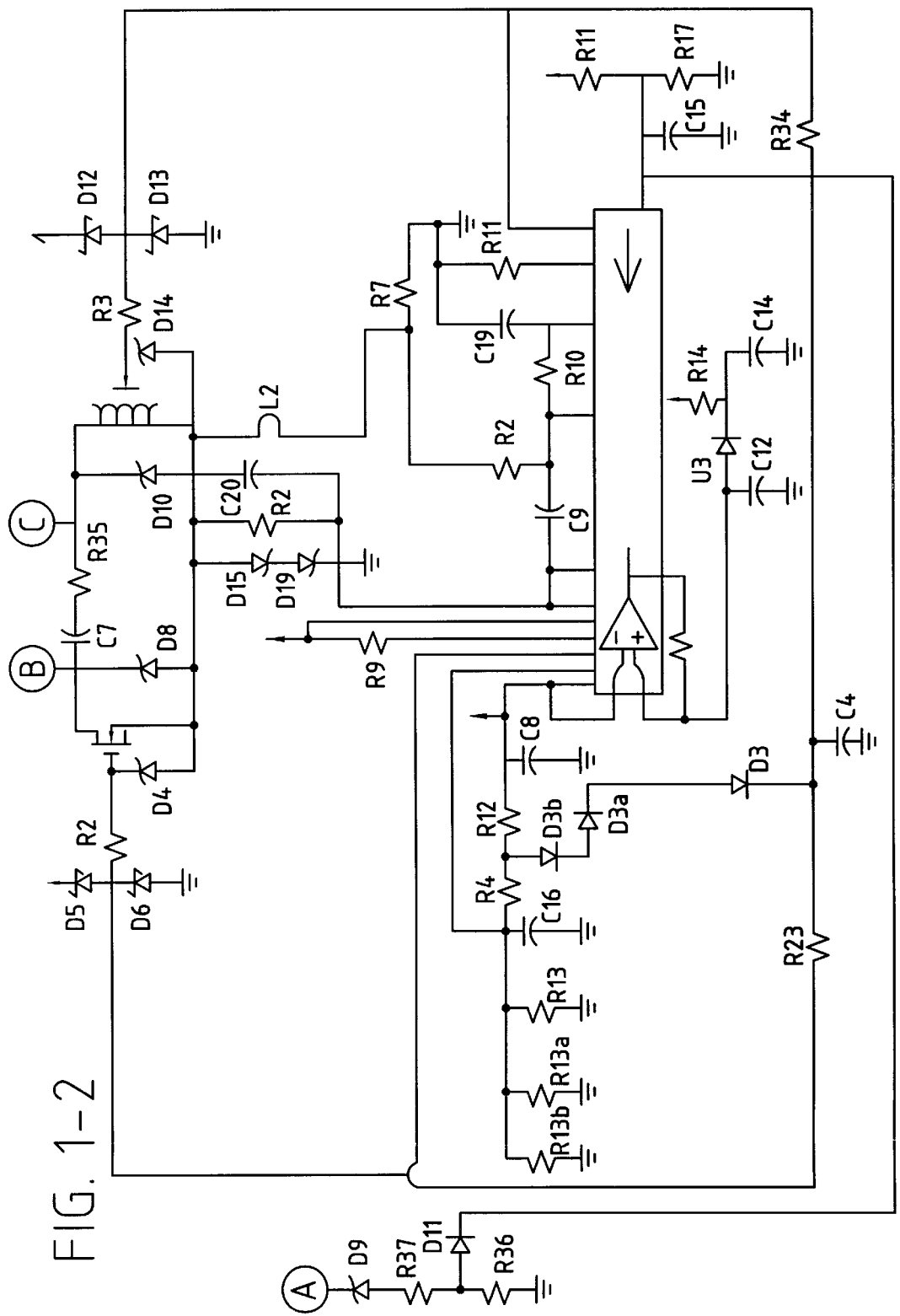
Figure 2:
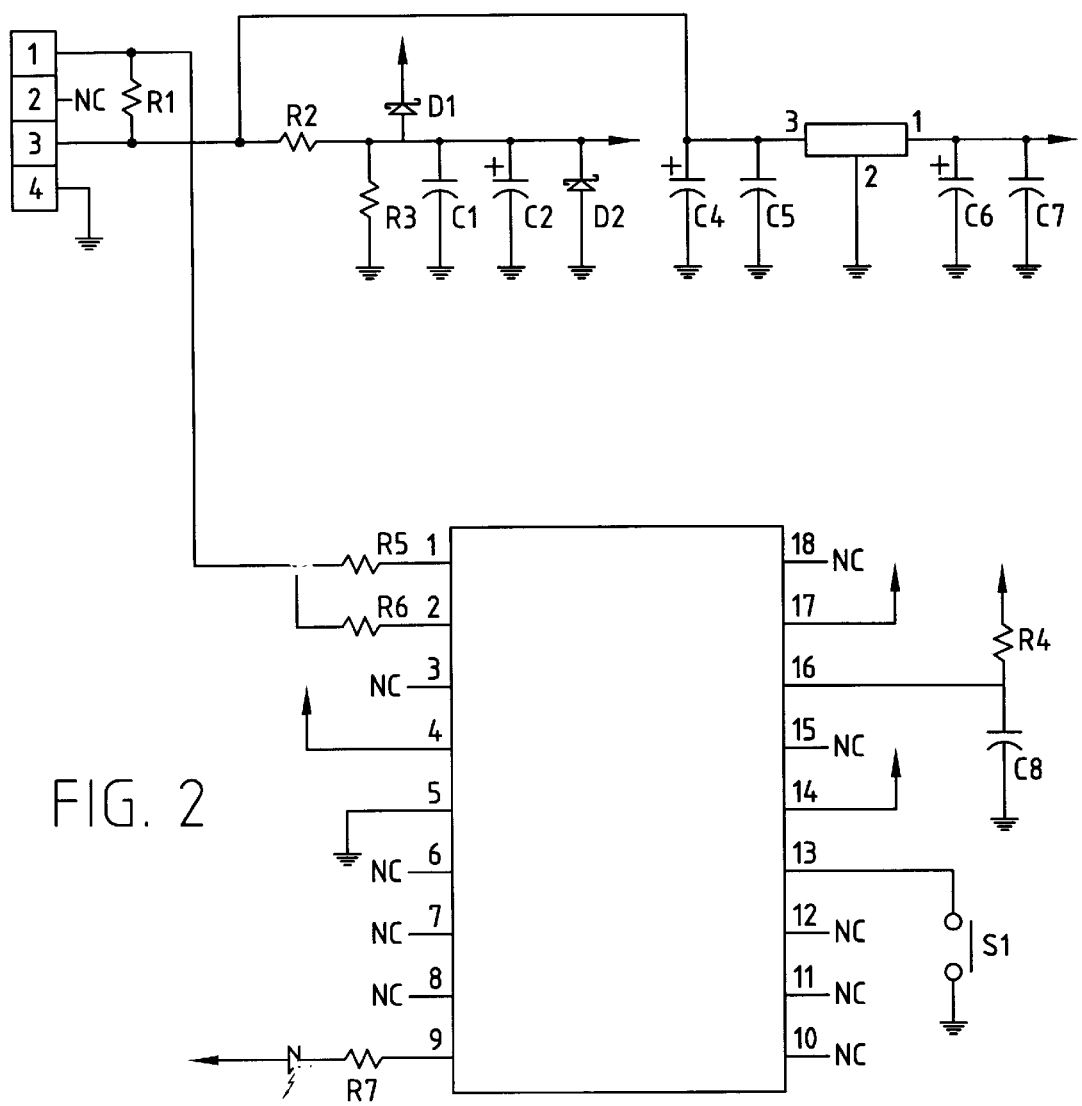

Referring now to the drawings, and to FIG. 1 in particular, circuitry for an external converter output control interface ("TCMS™ Interface") 14 is shown connected into the circuitry of a preferred type of power switching converter 12 to be used in a recreational vehicle or the like (not shown) for providing DC power to operate various accessories and appliances, and to charge the batteries. Converter 12 is preferably of the type disclosed in co-pending and commonly owned U.S. patent application Ser. No. 08/255,470 filed Jun. 8, 1994 (now U.S Pat. No. 5,600,550), the complete disclosure of which is expressly incorporated herein by reference. The interface 14 operates to vary the output voltage of the power switching converter in response to a signal from an optional module shown generally in FIG. 2, as discussed further below.

Referring now to FIG. 2, the module 10 includes a module connector 20 which has an input at node (3) connected to the battery voltage and an output at node (1) to deliver the control signal to the converter 12 via the interface 14 shown in FIG. 1. The input voltage at node (3) is connected to the battery voltage through a first analog circuit 24. The output, node (1), of the module connector 20 is connected to the microcontroller (U1) 22 of the module 10. Specifically, the output of the connector 20 is connected to pins 1 and 2 of the microcontroller 22. When these pins are active, they signal the system to 13.6 volts ("Normal Mode") and 14.4 volts ("Boost Mode"), respectively. Otherwise, system voltage remains at 13.2 volts ("Trickle Mode"). The microcontroller 22 will output these signals either manually when the user activates the switch 28 or automatically by operation of the software stored in the memory of the microcontroller.

Still referring to FIG. 2, the battery voltage, which also supplies the power to the microcontroller 22, is applied to the input of the first analog circuit 24. However, before it is so applied, the battery voltage is divided by three by means of a voltage divider comprising resistors R2 and R3. This is necessary because the maximum allowable voltage on the analog input is five volts. Theoretically, the battery voltage could be higher than 14.4 volts and, therefore, to protect the analog circuit, two Zener diodes are included, D1 and D2 (preferably type IN5817). The first Zener diode D1, is positioned between the input voltage (Vbatt/3) and 5 volts. The second Zener diode D2, is positioned between the input voltage (Vbatt/3) and ground. Therefore, the input voltage from the battery to the module connector 20 of the module 10 will never go below ground or above 5 volts. Finally, even if it did, the divider preferably includes protection circuitry to prevent destruction of the module 10.

The general operation of the module 10 is as follows. When the module connector 20 is plugged into the converter 12, the load resistor R1 (typically 750K) connected between node (1) and node (3) operates to signal the converter to decrease its output voltage from 13.6 V to 13.2 V ("Trickle Mode"). Thereafter, if pin 1 of the microcontroller 20 is pulled below a certain level in response to the input voltage, the microcontroller signals the converter to begin outputting a stepped up voltage equal to 13.6 V (Normal Mode). On the other hand, if pin 2 is pulled below a certain level the microcontroller signals the converter to output 14.4 V, i.e., the microcontroller will activate the "Boost" Mode (described in detail below). Now, more specifically, when the TCMS module connector 20 is plugged into the converter the output changes from 13.6 V to 13.2 V.

Figure 4A:
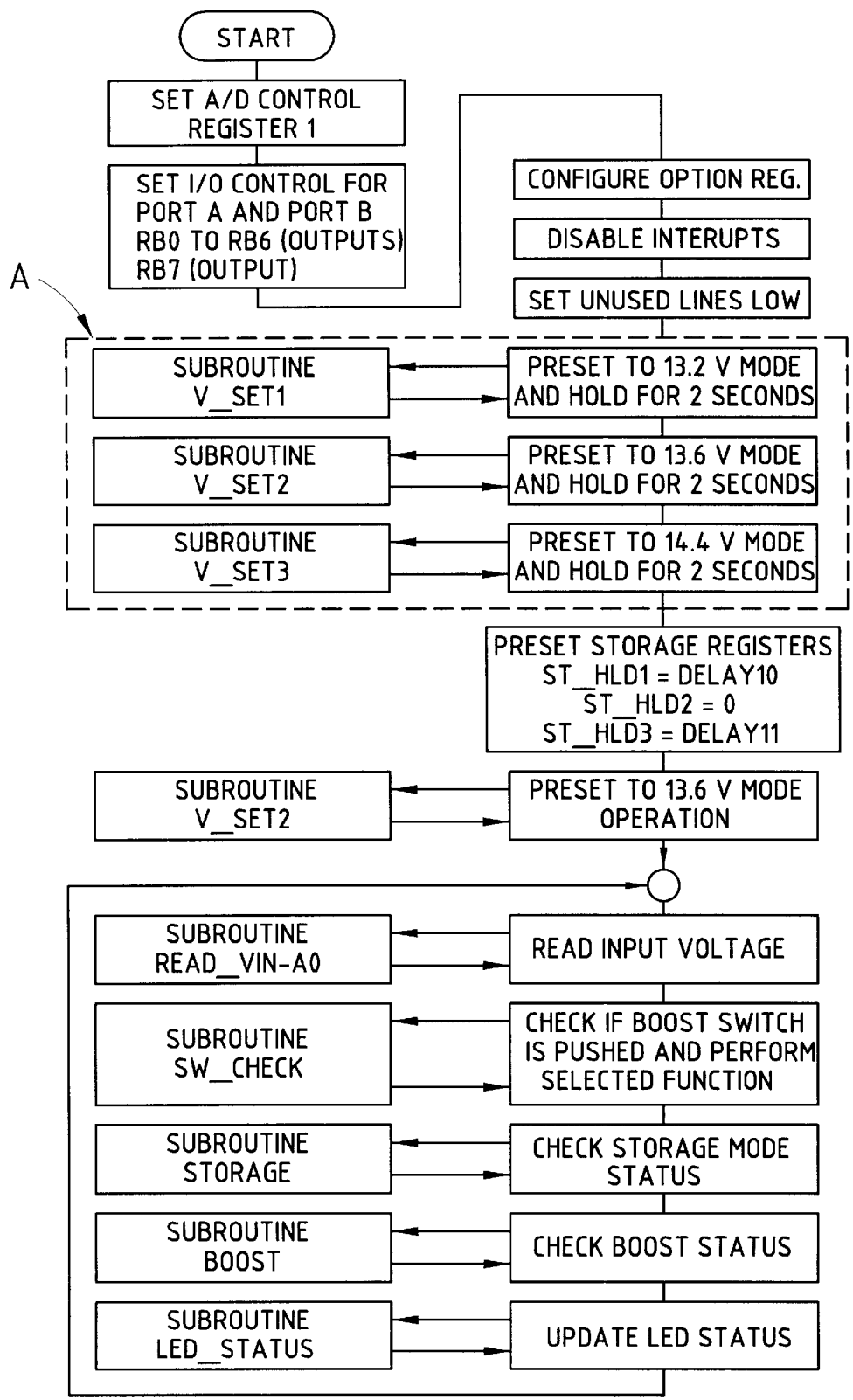
FIG. 4A is a flow diagram of the main program stored in the memory of the microcontroller in accordance with a preferred embodiment as illustrated in FIG. 2.
Figure 4B:
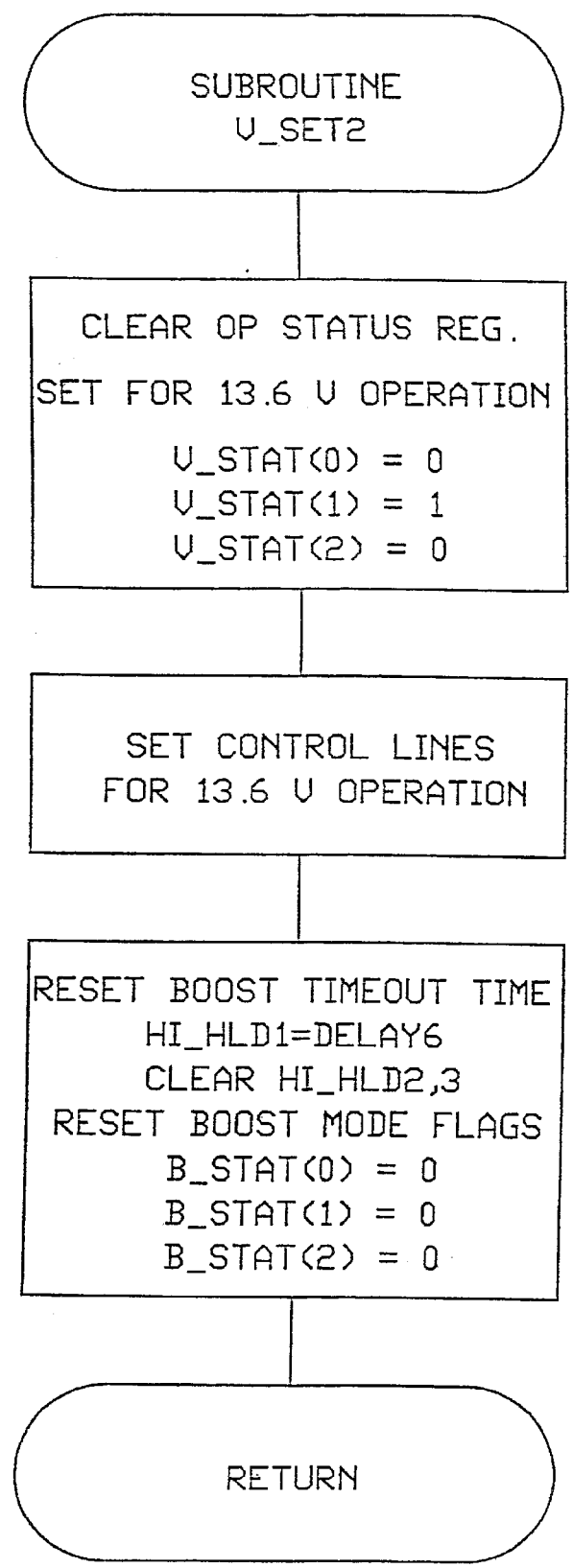
FIG. 4B is a flow diagram of the V_SET 2 subroutine contained in the main program of FIG. 4A and FIG. 5A, used to carry out Normal Mode configuration.

Referring generally to FIG. 2, and specifically to the diagram of main program in FIG. 4A, the microcontroller 22 of the module is initialized by configuring all the registers. Thereafter, the analog-to-digital control register and the input/output control for port A and port B (output pins RB0–RB6) are set. Then, the option register is configured, the interrupts are disabled and unused lines are set low. Each of the three modes just noted are cycled through to aid in manufacturing test items within the dash-line rectangle labeled "A". Next, to aid in later identification of which units should be in "Storage" Mode, all the storage registers are preset. Thereafter, the first subroutine, V_SET2 is called (FIG. 4B). This subroutine clears the operation status registers and then sets the microcontroller to output a signal for Normal Mode operation: V_STAT(0) set low, V_STAT(1) set high and V_STAT(2) set low. Thereafter, the subroutine sets the control lines for Normal Mode operation and returns the system back to the main program. When the Normal Mode signal is received, the converter will have an output of 13.6V.

Figure 4C:
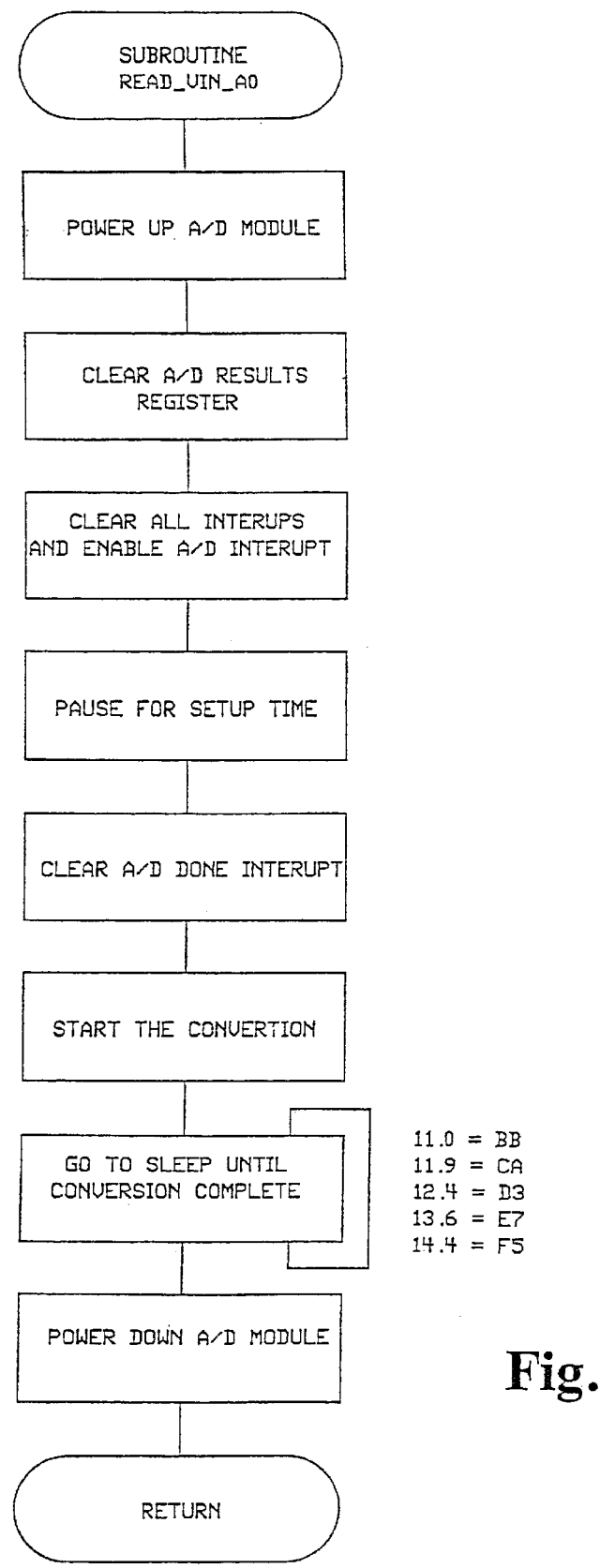
FIG. 4C is a flow diagram of the READ_VIN_AO subroutine contained in the main program of FIG. 4A and FIG. 5, used to read the input voltage.

Then the microcontroller 20 reads the input voltage at pin (17) and invokes subroutine READ_VIN_AO (FIG. 4C). As previously mentioned, the microcontroller 20 has a built in analog-to-digital (A/D) converter and it is activated by the Read subroutine. Referring to FIG. 4C, after the A/D module is powered up, the subroutine clears the output register. Then, the subroutine clears all the interrupts and enables the A/D interrupt. After a pause, it clears the "A/D DONE" interrupt. Next, the conversion is started and the microcontroller enters a "sleep mode", until the conversion is complete. The sleep mode turns all the I/O functions into high impedances and shuts down all unrelated microcontroller subsystems, reducing switching noise during the conversion. Upon completion, the A/D module is powered down.

Figure 4D:
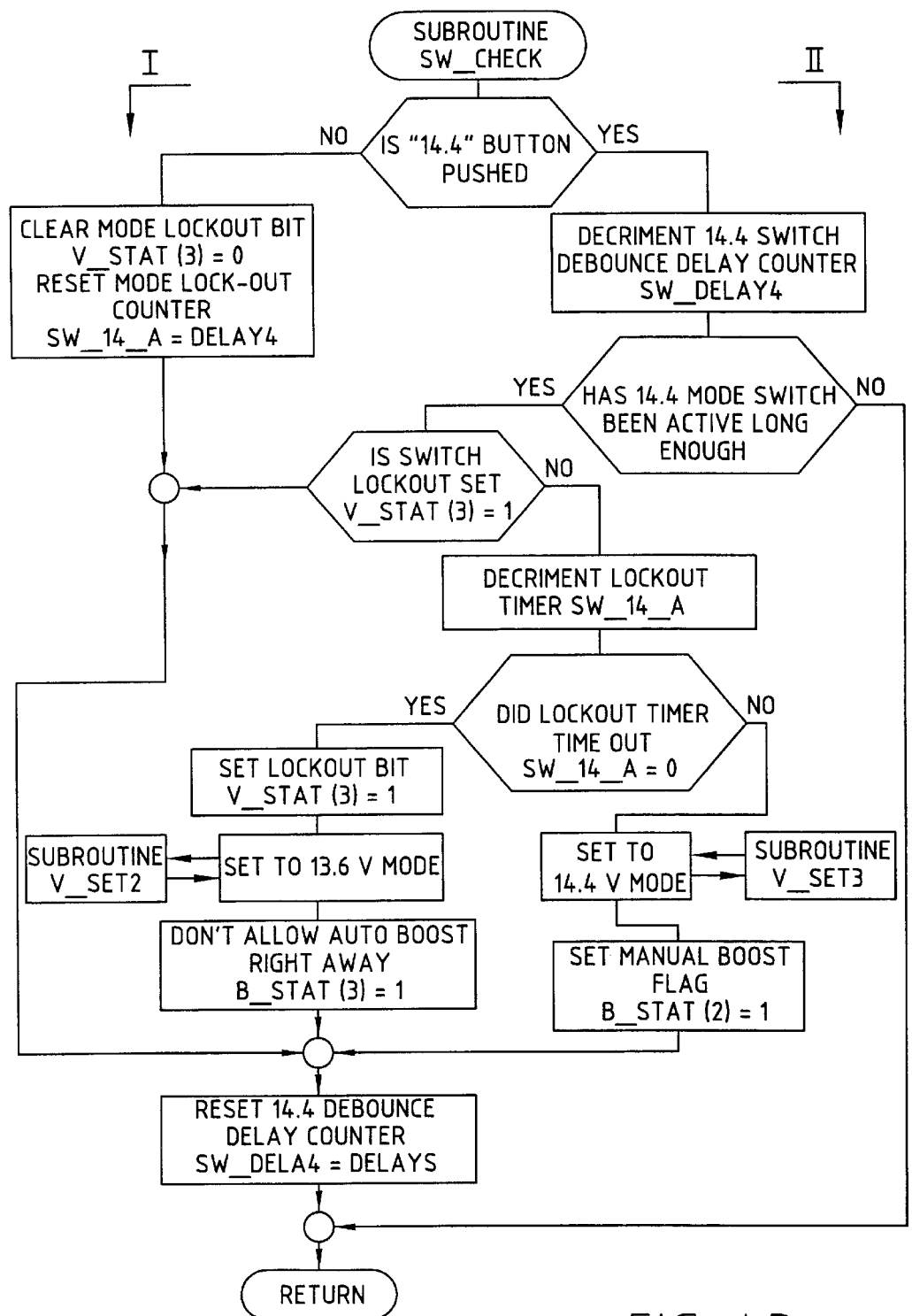
FIG. 4D is a flow diagram of the SW_CHECK subroutine contained in the main program of FIG. 4A and used to check the status of the manual Boost switch.

After reading the input voltage, the main program will check to see if any of the switches are activated (in this case, there is only one—the "Boost" switch) by invoking subroutine SW_CHECK. Referring to FIG. 4D, this subroutine first determines whether the "Boost" (14.4 V) switch is pressed.

If the program determines that the switch is pressed, the program executes the instructions contained in the branch marked "II" in FIG. 4D. When the user activates the Boost switch the signal may fluctuate. Therefore, a small delay is included in the program by way of the Boost switch debounce delay counter so that the system does not detect boost mode merely on noise.

Figure 4E:
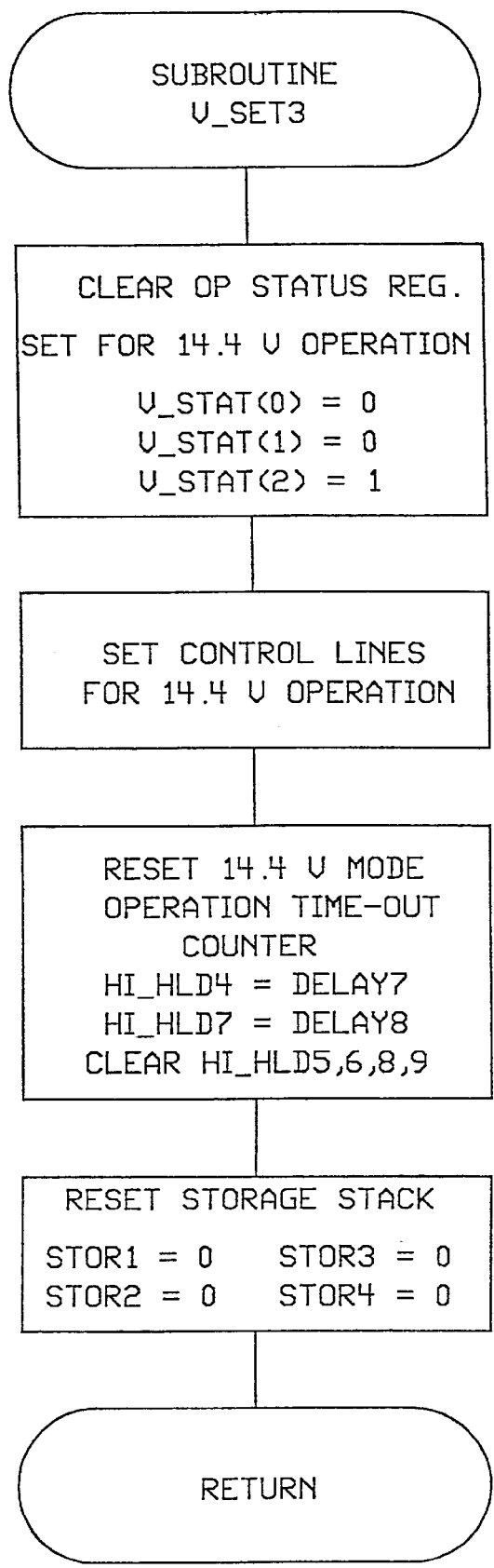
FIG. 4E is a flow diagram of the V_SET 3 subroutine contained in the main program of FIG. 4A and FIG. 5A used to carry out Boost Mode configuration.

While the delay counter decrements, the program reverts back to the main route. Once the delay is complete, the program determines if the lockout bit was set (V_STAT(3) set high). If the Boost switch has been active longer than the debounce delay and the switch has not been pushed for too long, i.e., V_STAT(3) set low, the SW_CHECK subroutine continues to decrement the lockout timer (the timer which monitors how long the switch has been pushed). If the lockout timer has not "timed out," SW_CHECK calls the Boost subroutine (see FIG. 4EV_SET3) which signals the converter to output 14.4 V, i.e., pin 2 of the microcontroller 22 is activated. The subroutine then sets a flag (B_STAT(2) set high) to indicate that the unit is in the Boost Mode because the Boost switch was activated. At this point, the debounce delay counter is reset and the program exits subroutine SW_CHECK and returns to the main program.

On the other hand, if the switch is active beyond a predetermined time, the lockout timer would time-out. This could happen either accidentally (i.e., if the user places something on top of the module thus leaving the button continuously engaged) or inadvertently (i.e., if the switch becomes shorted). If this time-out occurs, the program sets the lockout flag (V_STAT(3) set high) and returns the system to normal (13.6 V) mode by activating pin 1 of the microcontroller 22 in order to prevent damaging the battery. In addition, a flag is set (B_STAT(3) set high) in the Boost subroutine to prevent the unit from entering the Auto Boost Mode for one hour.

Returning the system to Normal Mode operation is particularly desirable if the operator has intentionally held the Boost switch active beyond a predetermined maximum time. Although the system will exit Boost Mode when one of the Boost Mode "time-outs" (described hereinafter) expires, in this situation the operator wants the unit to exit Boost Mode without waiting for the expiration of one of the "time-outs". Thereafter, the debounce timer is reset and the program exits SW_CHECK and returns to the main program.

Figures 2, 4F:
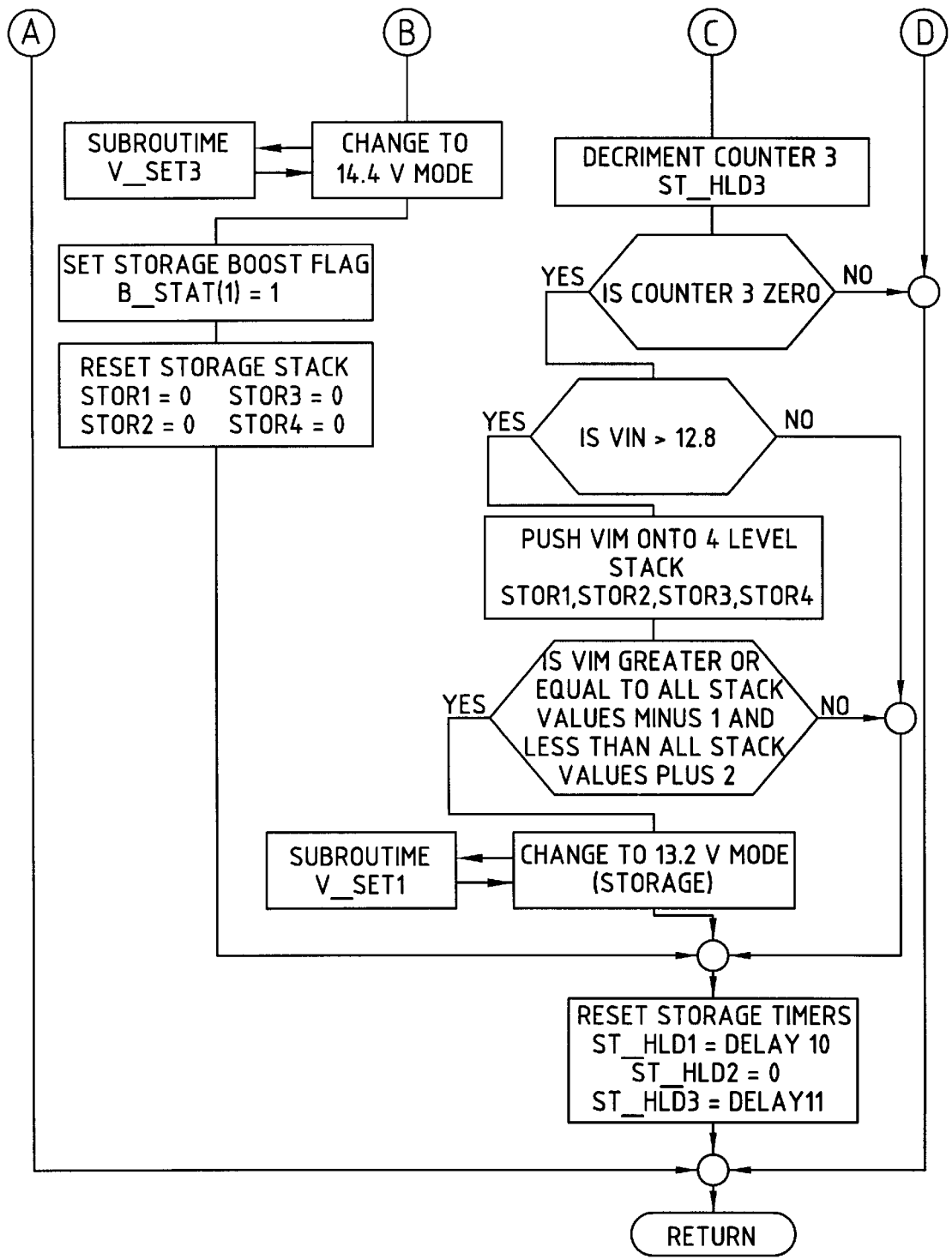
FIG. 4F is a flow diagram of the STORAGE subroutine contained in the main program of FIG. 4A and FIG. 5A, used to control Storage/Trickle Mode.
Figure 4G:
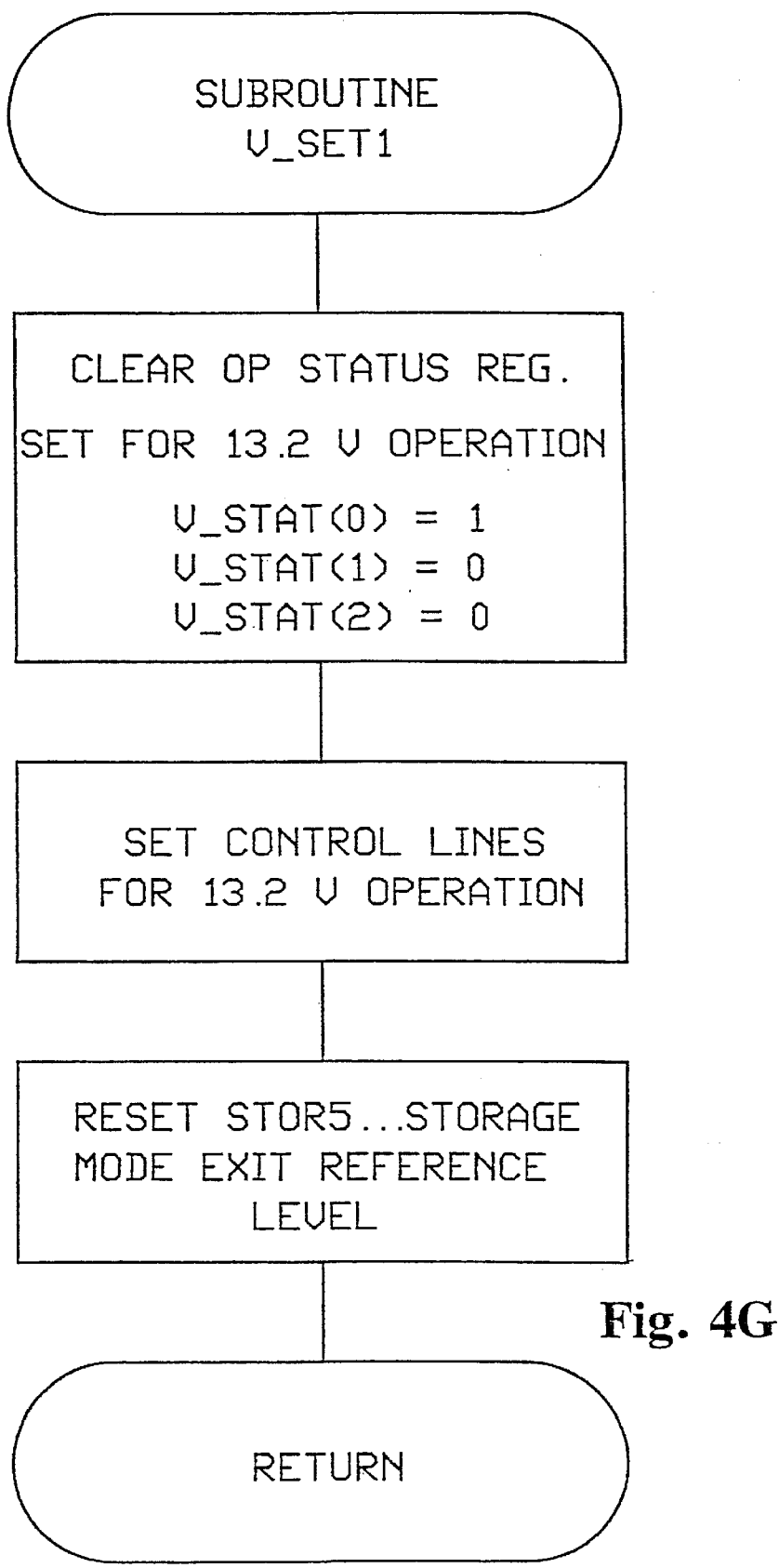
FIG. 4G is a flow diagram of the V_SET 1 subroutine contained in the main program of FIG. 4A and FIG. 5A and is used to carry out Trickle Mode configuration.
Figures 2, 4H:
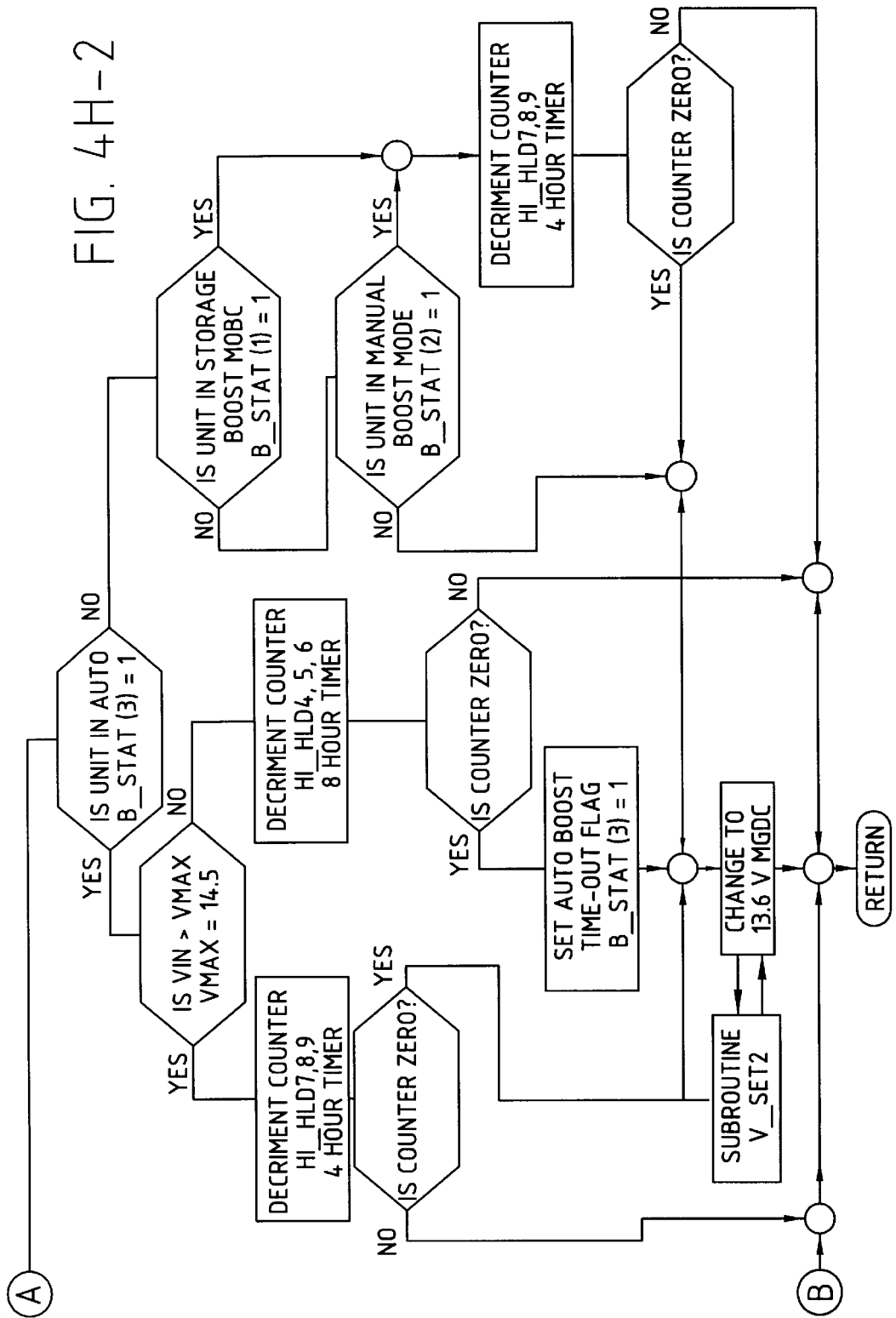
FIG. 4H is a flow diagram of the Boost subroutine contained in the main program of FIG. 4A and FIG. 5A and is used to control the automatic Boost function and all time-out features of the Boost Mode.

Alternatively, if the Boost switch is not active the program executes the instructions contained in the branch marked "I" in FIG. 4D. In this case, the mode lockout flag and the mode lockout timer will be reset. Again the debounce timer is reset and the program exits subroutine SW_CHECK and returns to the main program. Next, the main program asks whether it should be in Storage Mode by invoking subroutine STORAGE (FIG. 4H).

In subroutine STORAGE, the program cycles through a continuous loop while constantly keeping track of the battery voltage in order to determine whether it should be in "storage" mode. The program employs various timers, as noted, which are checked periodically, approximately every 15 minutes, while the module is active. The program then asks whether the module is in 13.2 V mode, i.e., Storage Mode. If not, the timers are continuously checked as the rest of the subroutine is executed (discussed below). If it is, the program executes the following instructions.

When the module 10 signals to the converter 12 to decrease its output voltage from 13.6V to 13.2V, the battery will not instantly change its charge state, it will "bleed" off the extra charge. (This is one reason for the approximate 15 minute delay in checking the timers.) After this initial delay, if the system is in "Storage" Mode, the register which contains the Storage Mode reference voltage ("STOR 5") is compared with the input voltage. If the input voltage is greater than the reference voltage STOR 5 the input voltage is saved in STOR 5 and the program exits subroutine Storage. Otherwise, the program will ask whether the battery (input) voltage is less than the value of the Storage Mode reference voltage minus one. If it is, the program invokes the Boost Mode subroutine to change back to a 14.4 V charge and a flag is set showing that Boost Mode was initiated by the Storage subroutine and several storage registers are cleared. Essentially, the program attempts to determine whether, after the converter has been in Storage Mode for a certain time, the user began using any of the RV load devices. If so, there would be a measurable drop in battery voltage. At this point, the program directs the system to exit Storage Mode and returns to the main program. On the other hand, if the reference voltage has not changed, i.e., the battery voltage is not less than the value of the Storage Mode reference voltage minus one, the system stays in Storage Mode and the program will exit subroutine STORAGE.

If the module is not in Storage (13.2 V) Mode the program will wait twenty-four hours before it enters Storage Mode because it may take a day or more for the battery to stabilize after it has been in use. In order to implement this operation, the program executes a counter loop, which will delay the reading of the battery voltage for six hours. Then, every six hours, the program stores the battery voltage into a stack of registers. Thereafter, the program asks whether the battery voltage has changed and, in particular, whether the voltage has not changed for twenty-four hours. The program does this by asking whether the battery voltage is greater than or equal to all the stack values minus one and whether it is less than all the stack values plus two. If not, the system is not ready to enter "Storage" Mode because the battery voltage has changed. In this case, either the battery is not fully charged or the RV is being used. Therefore, the program exits the Storage subroutine and returns to the main program. However, if the battery voltage is within the limits set by the program, the battery has been dormant, and therefore subroutine STORAGE (FIG. 4F) invokes the Storage Mode subroutine (V_SET1) (FIG. 4G) thus signaling the converter to charge at 13.2 V, i.e., Storage Mode. Finally, when it invokes Storage Mode, the program resets the timers and returns the main program.

Another feature of the invention is that the microcontroller 22 incorporates an alternate means of exiting "Boost" Mode. If the battery voltage reaches 14.0 V, it has been fully charged and there is no reason to remain in Boost Mode. Therefore, in order to protect the battery, the module contains a voltage limit (in addition to the time limit discussed earlier) which signals the converter to return to Normal (13.6V) Mode after four hours. Although the voltage limit might seem to eliminate the need for a time limit, this is not so. If the voltage limit is set at, for example, 14.0 V and there is a relatively large load on the battery and converter due to heavy use, the converter may not be able to charge the battery up to this limit. As a result, the converter would continue to apply the full Boost Mode charge as long as these conditions prevailed, however extended that might be, and the battery could damaged. Therefore, the dual method of exiting the "Boost" Mode on either a voltage limit or time limit operates to ensure that the battery is protected.

Overall, the module 10 will activate Boost Mode in any of three different ways as shown in the Boost subroutine (FIG. 4H). First, if the user manually activates the "Boost" Mode switch 28 (FIG. 2), the microcontroller 22 outputs a control signal directing the converter 12 to charge at 14.4 V. The microcontroller will continue to signal the converter to charge in Boost Mode for four hours. Second, the converter may enter Boost Mode automatically when it has been "awakened" from Storage Mode. In this case, the program will also signal the converter to charge in Boost Mode for four hours. Finally, the module may enter "Boost" mode automatically during execution of the Boost routine based on battery voltage readings obtained by invoking the READ_VIN_AO subroutine (FIG. 4C). If the battery voltage drops below a certain point, the Boost routine invokes "Auto Boost" to set the flags and configure the outputs for "Boost" Mode. In "Auto Boost" the unit will run for a maximum of eight hours unless the battery voltage rises above 14.0 volts in which case the converter will continue to run for four hours after the 14.0 volt level is detected. If the unit runs eight hours without exceeding 14.0 volts, the unit cannot go into "Auto Boost" for one hour because the charge on the battery is low.

Figure 4I:
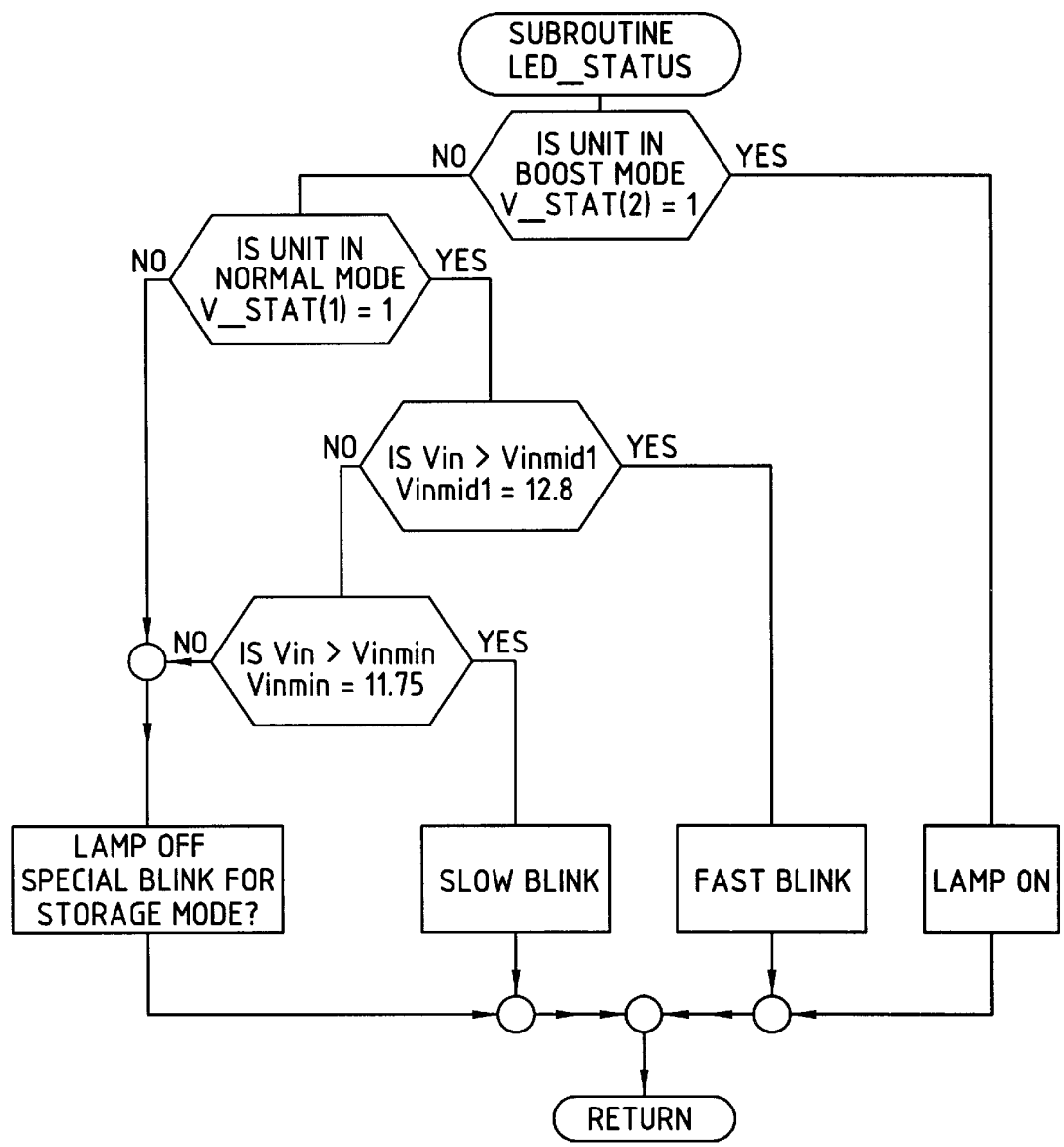
FIG. 4I is a flow diagram of the LED_STATUS subroutine contained in the main program of FIG. 4A and is used to control the LED status indicator.

According to another aspect of the invention, there is an LED indicator for displaying system status (FIG. 4I). If the LED is on continuously, this indicates the unit is in the Boost Mode. If the LED is flashing rapidly, this indicates that the battery is either at full charge or is being charged. If the LED is flashing slowly, the battery is at greater than 50% charge and that the battery is being discharged. If the LED is off, the system is either in the Storage Mode or the battery is at less than 50% charge.

Figure 3:
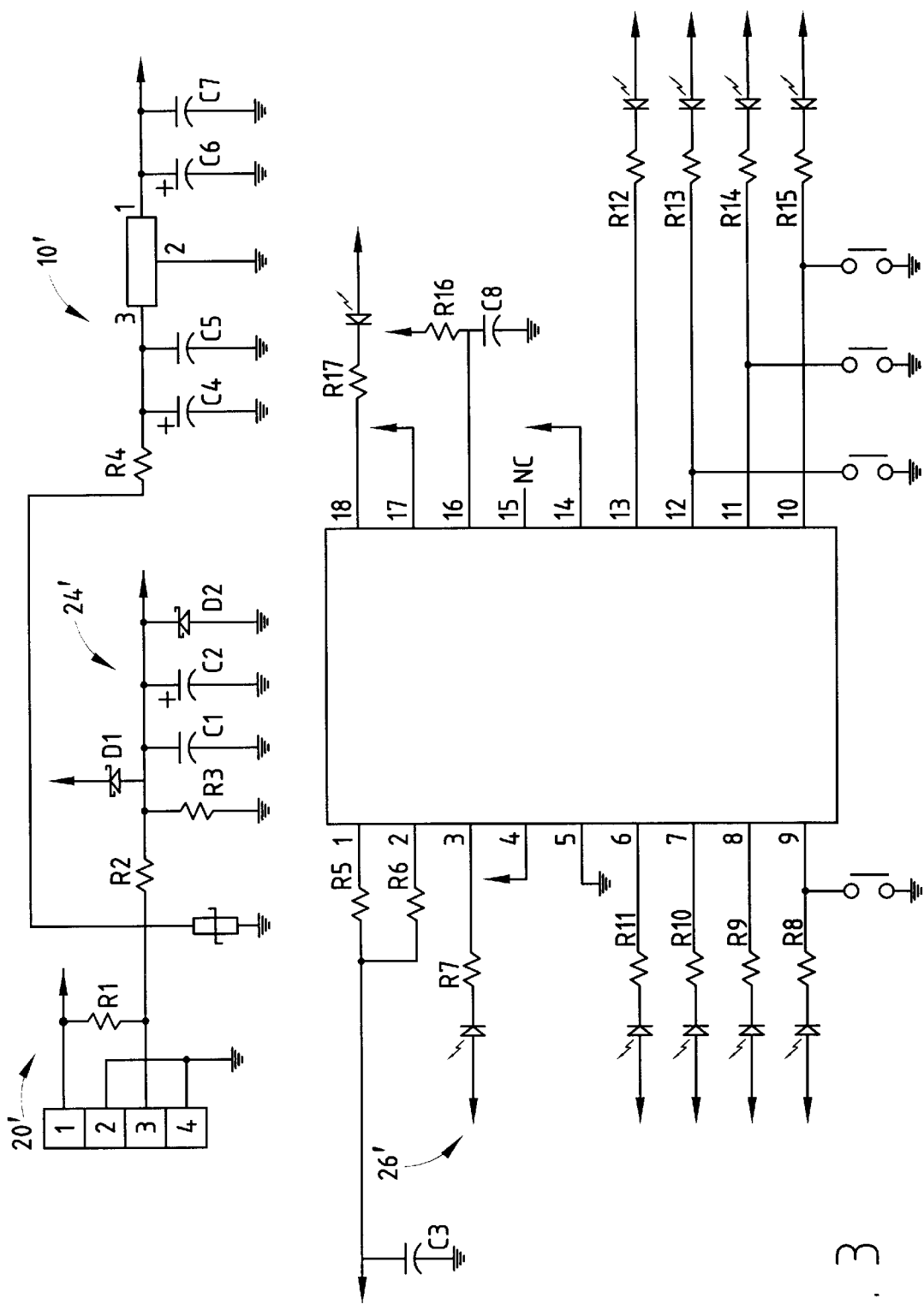
FIG. 3 is a schematic view of another preferred control module including a microcontroller, according to another embodiment of the invention.
Figure 5A:
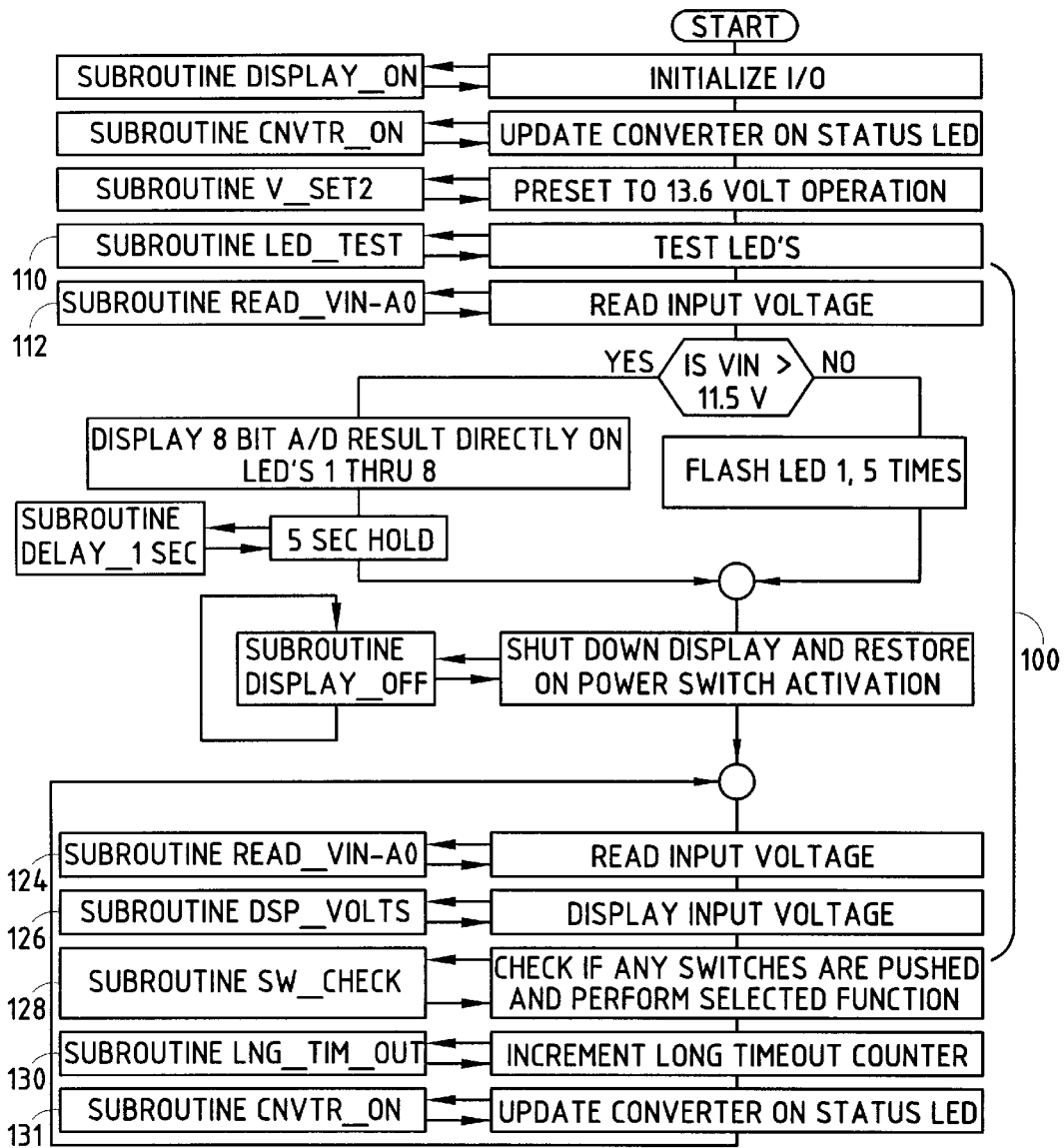
FIG. 5A is a flow diagram of the main program stored in the memory of the microcontroller of the embodiment illustrated in FIG. 3.
Figure 5B:
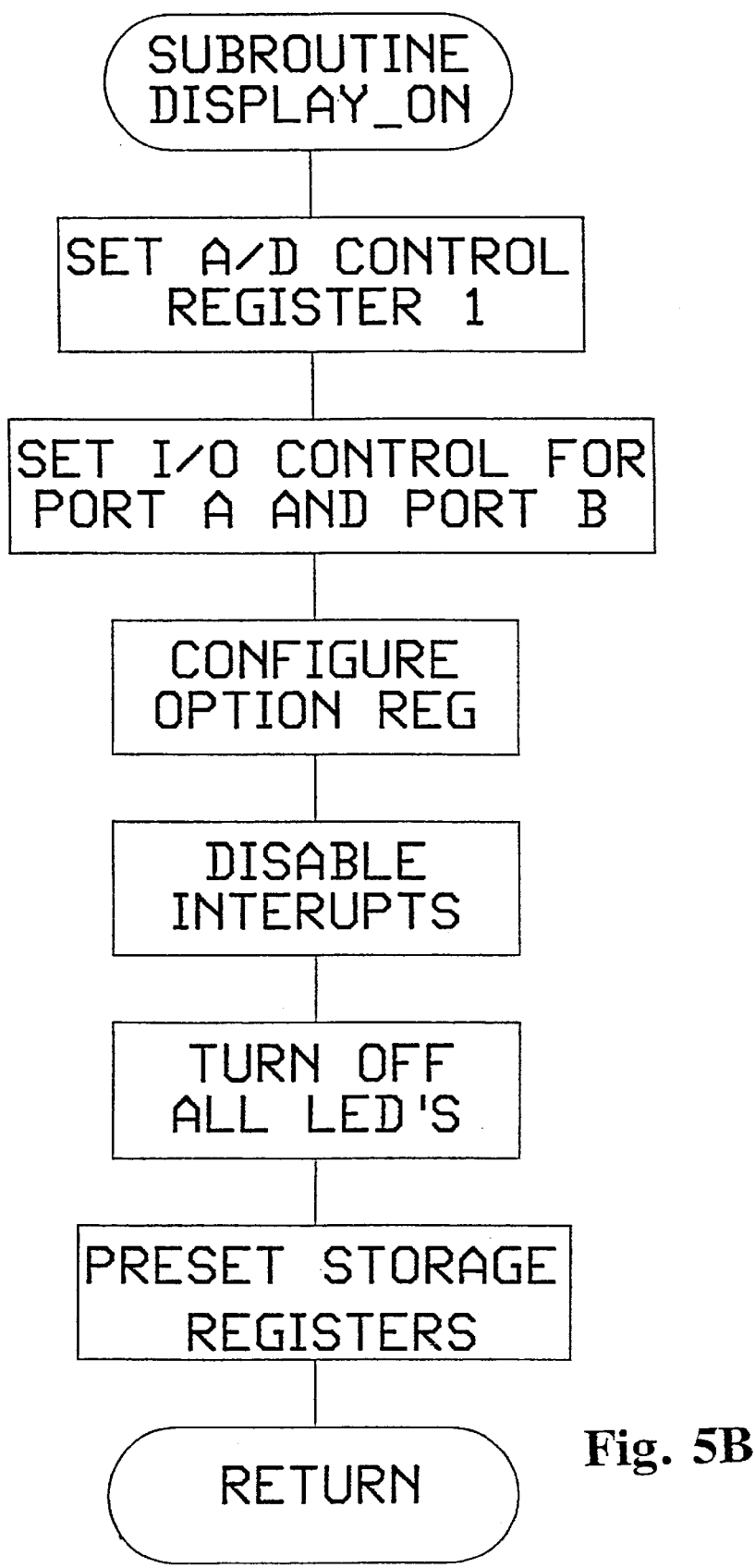
FIG. 5B is a flow diagram of the DISPLAY_ON subroutine invoked by the program of FIG. 5A.
Figure 5C:
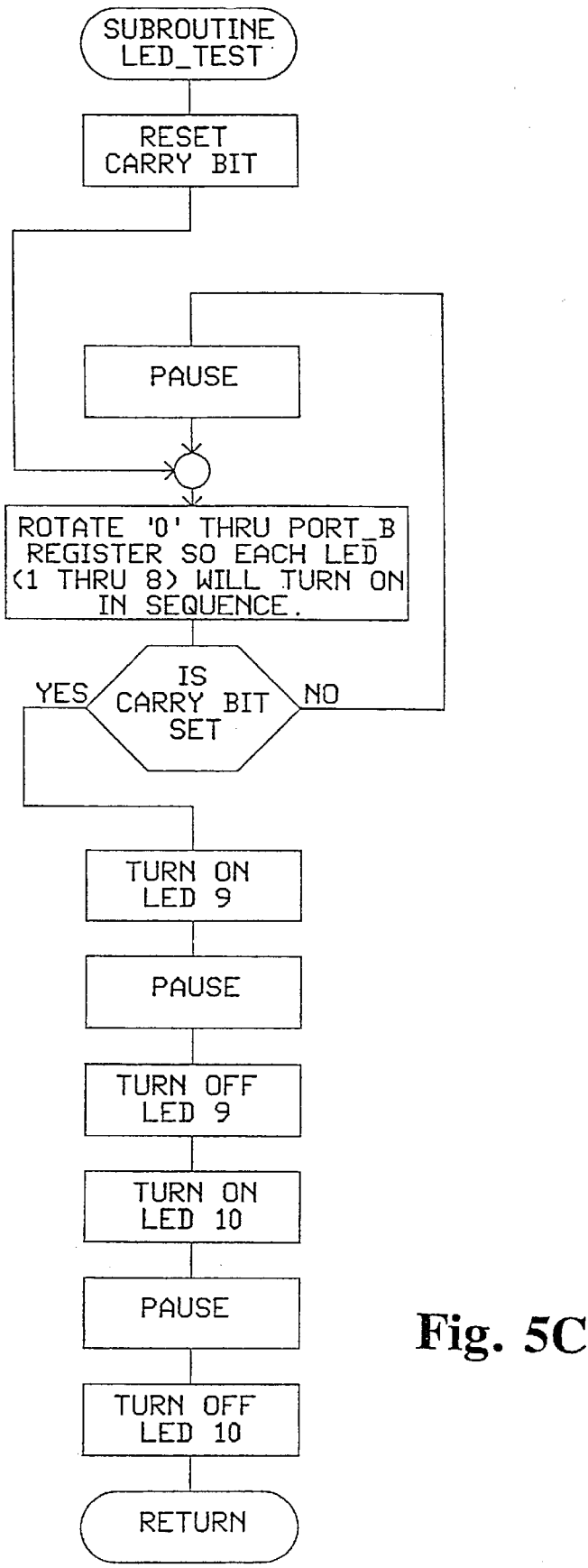
FIG. 5C is a flow diagram of the LED_TEST subroutine invoked by the program of FIG. 5A.

An alternate embodiment of the invention is shown in FIG. 3. The operation of this embodiment is shown by the series of flow diagrams in FIGS. 5A–5J inclusive, and in general is very similar to the operation described above. As shown is FIG. 5A, the main program invokes a series of routines to initialize the I/O, turn the display on (FIG. 5B), and preset the system to Normal (13.6 V) Mode (FIG. 4B). Like the first embodiment, when the connector of the module is plugged into the converter, the 1M load between node three on the connector (the input) and node one on the connector (the output) causes the converter to change its charge from 13.6 V to 13.2 V. Thereafter, if either pin 1 or pin 2 on the processor 22' is pulled low, the processor will signal the converter to charge in "Normal" Mode (13.6 V) or "Boost" Mode (14.4 V), respectively.

In addition, the main program (FIG. 5A) incorporates a series of routines 100 to implement a means for localizing problems with the assistance of the manufacturer. First, the program will blank the individual LEDs (subroutine 110) in order to make sure they are all connected when power is originally applied to the display. Then the program will instruct the processor to read the input voltage (at step 112, using the routine shown in FIG. 4C). Thereafter, the program will ask whether this voltage is less than 11.5 V in order to check the status of the battery. If the voltage is below 11.5 V, the battery is almost dead (less than 50% charge) and the LED indicating the lowest voltage (11.7 V, shown at pin 9 of microcontroller U1 in FIG. 3) will flash five times. The program will then instruct the microcontroller 22' to turn the display off. On the other hand, if the input voltage is above 11.5 V, the contents of the A/D register are displayed. When a problem is encountered, the user reads the digital output (displayed when the unit is unplugged and then plugged in again) which stays up for approximately five seconds. The user then relays this information to the manufacturing service department which will attempt to identify the problem. (In addition, the user can place a volt meter across the battery to provide the service department with further information regarding the possible problem.) When complete, the display shuts off and the system enters an energy conservation mode.

Figures 1, 2, 5D:
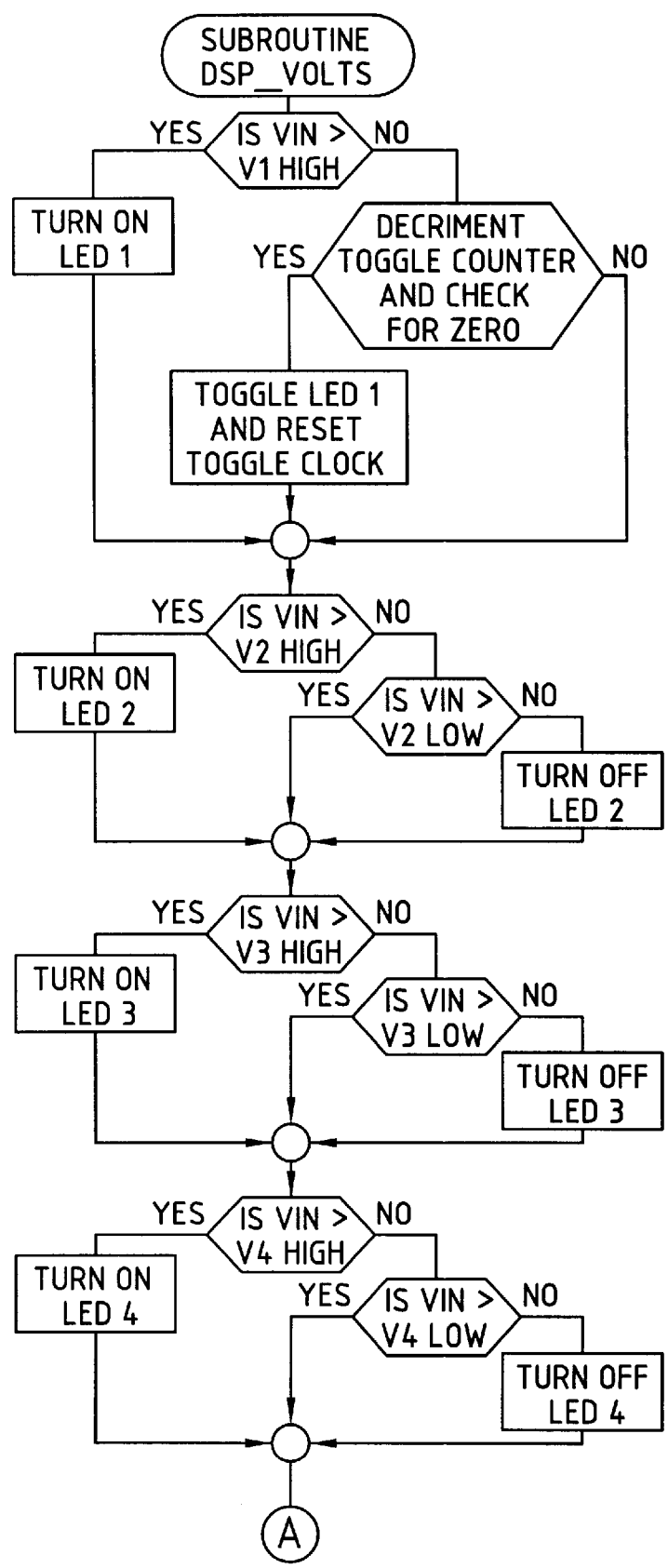
FIG. 5D is a flow diagram of the DSP_VOLTS subroutine invoked by the program of FIG. 5A.
Figures 2, 5D:
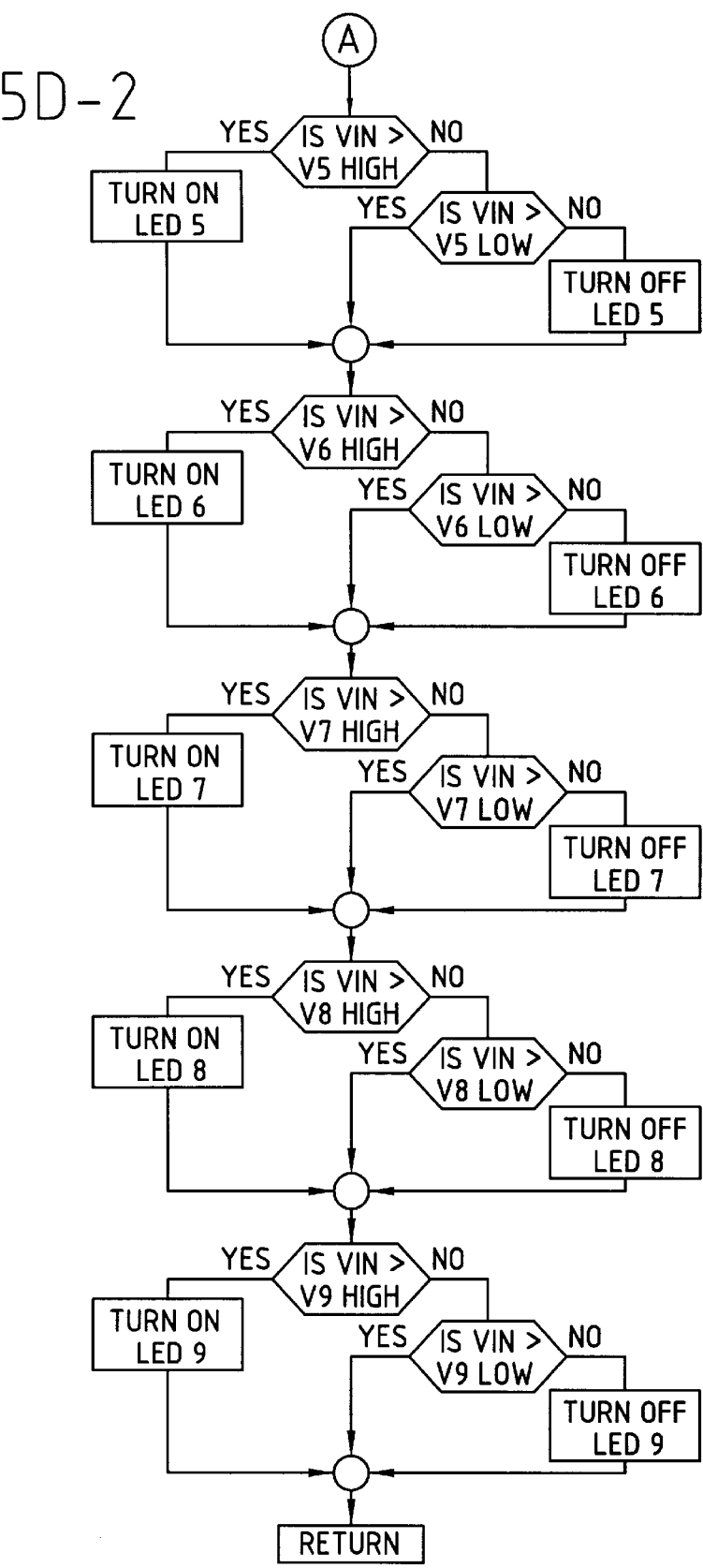
Figures 2, 5E:
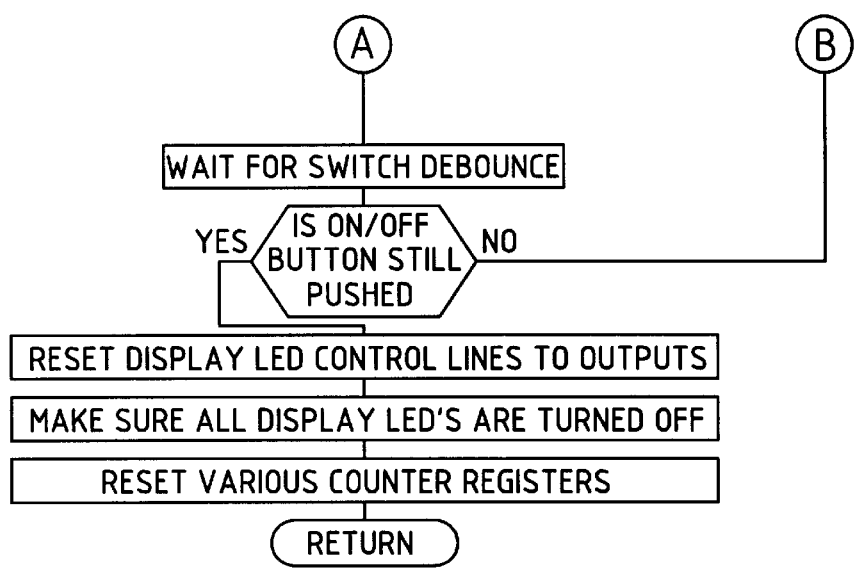
FIG. 5E is a flow diagram of the DISPLAY_OFF subroutine invoked by the program of FIG. 5A.

Next, the program enters essentially the same type of control loop subroutine (SW_CHECK, FIG. 5F) as implemented in the first embodiment. First, the main program instructs the microcontroller 22' to 124 read the input voltage. Then, unlike the first embodiment, the program displays 126 the input voltage by invoking subroutine DSP_VOLTS (FIG. 5D). As described previously, assuming the display is on (either automatically when the main program is initialized or manually when the user engages switch PB1 shown connected to pin 9 of microcontroller U1 in FIG. 3), if the input voltage is less than the threshold voltage for the lowest LED indicator (11.7 volts) the program will flash the LED to signify that the battery is almost dead. The program will update the battery status every time it cycles through the control loop checking the switches (32' in FIG. 3) for each mode of operation (128, FIG. 5A). In addition to checking the "Boost" Mode switch described in the first embodiment, the SW_CHECK subroutine of this embodiment (FIG. 5F) checks each mode of operation during every cycle. Furthermore, each mode of operation (13.2 V, 13.6 V and 14.4 V) may be checked manually with the series of switches, PB2, PB3, and PB4, shown in FIG. 3 connected to pins 12, 11 and 10 of the microcontroller 22'.

Figures 2, 5F:
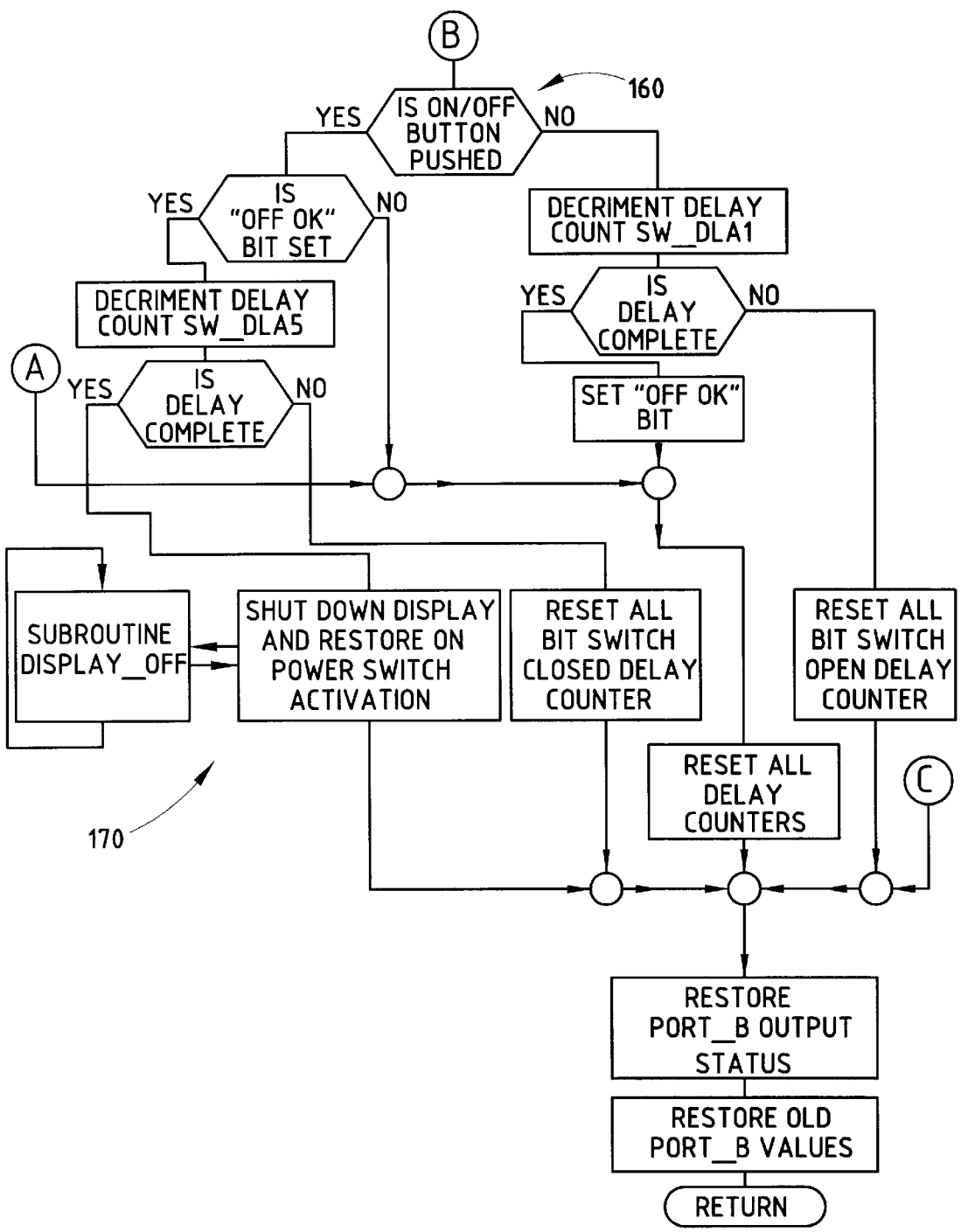
FIG. 5F is a flow diagram of the SW_CHECK subroutine invoked by the program of FIG. 5A.
Figure 5G:
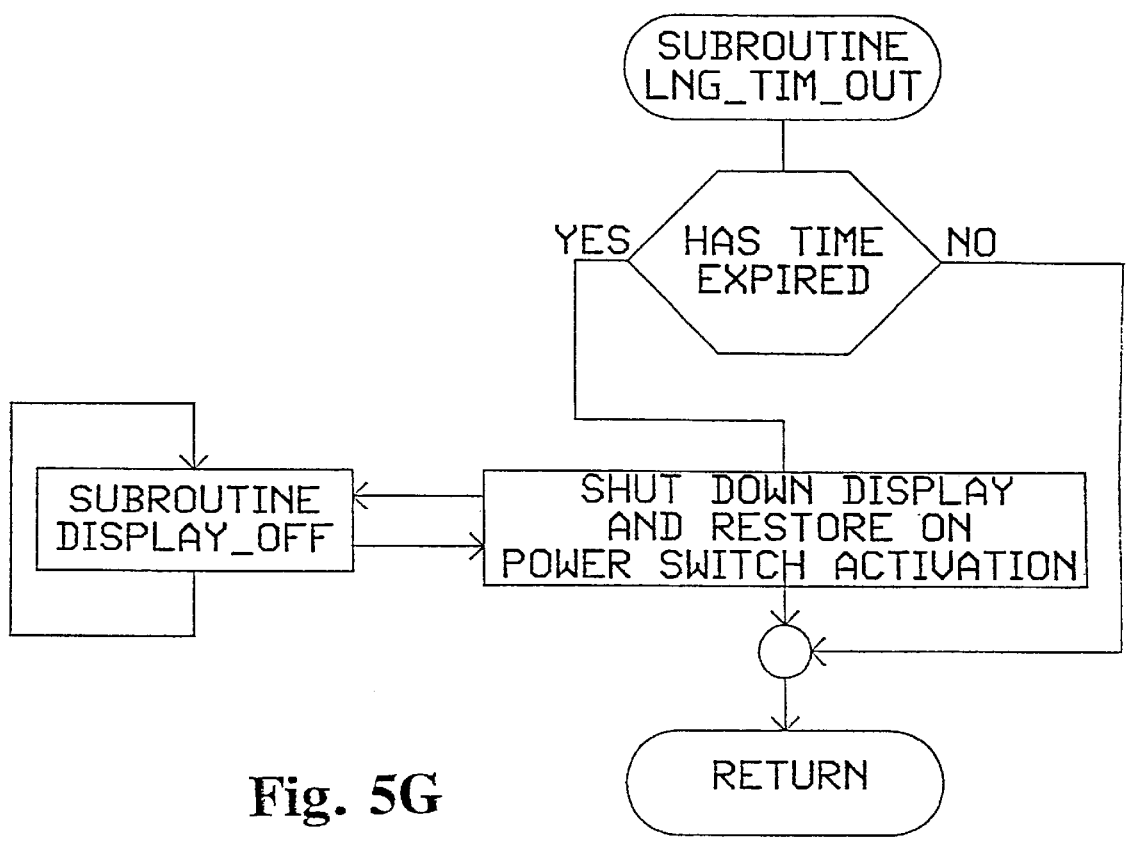
FIG. 5G is a flow diagram of the LNG_TIM_OUT subroutine invoked by the program of FIG. 5A.
Figure 5H:
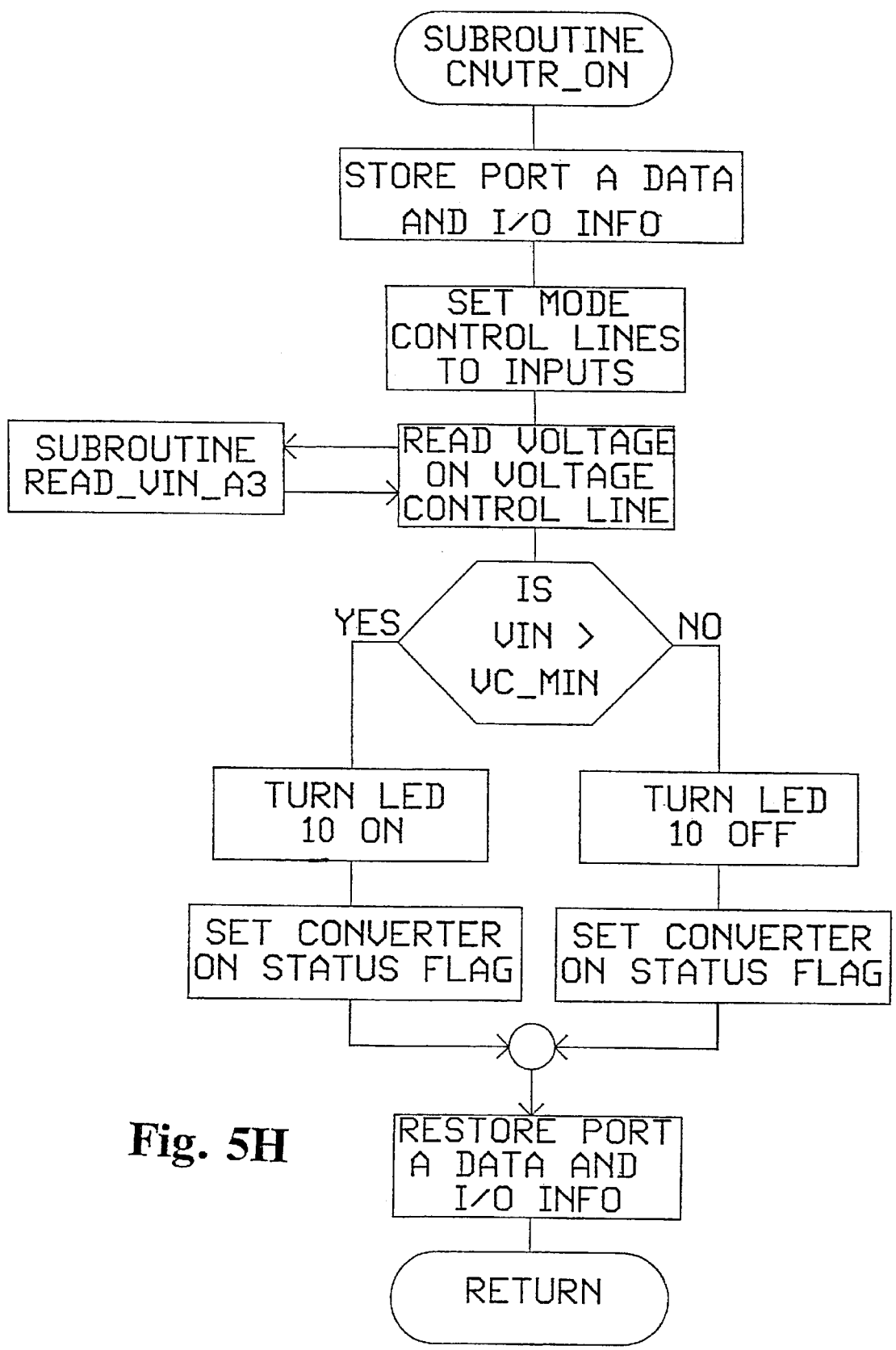
FIG. 5H is a flow diagram of the CNVTR_ON subroutine invoked by the program of FIG. 5A.
Figure 5I:
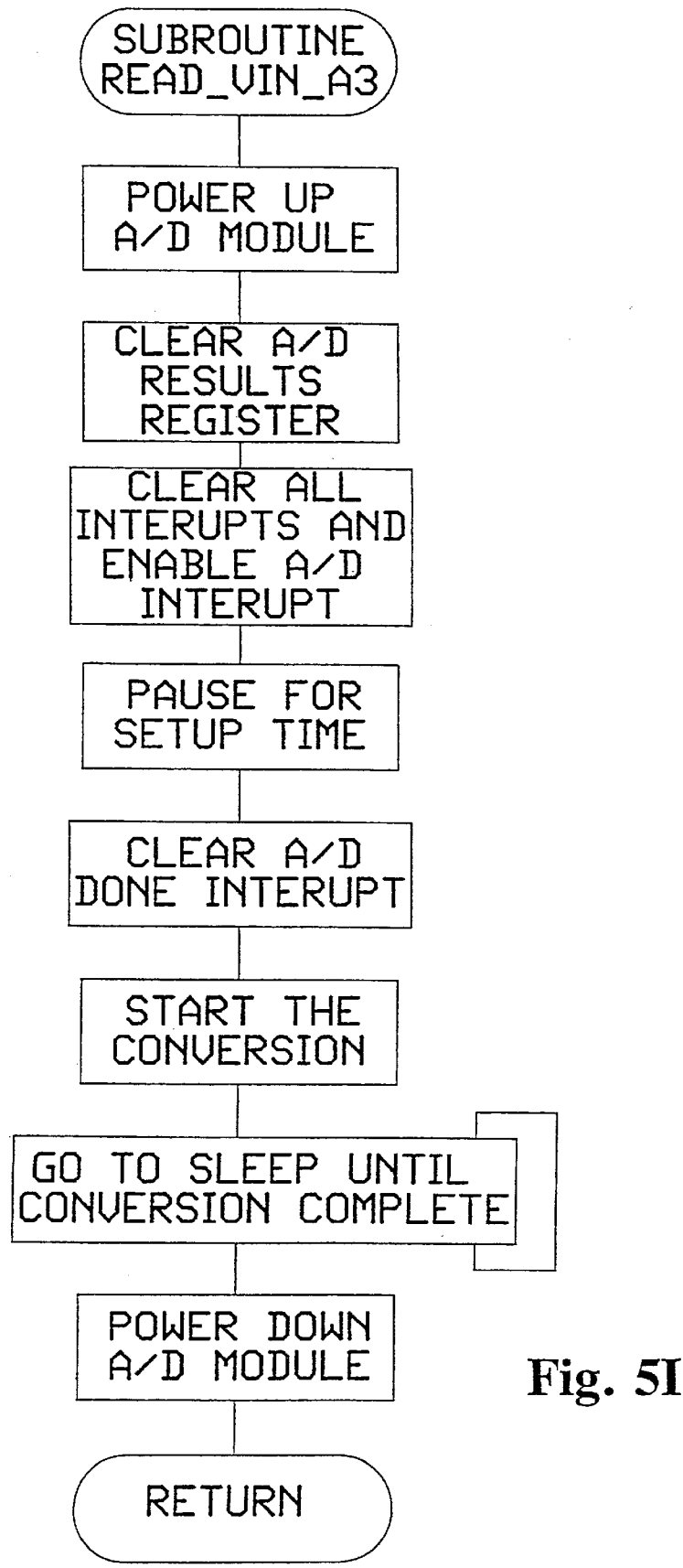
FIG. 5I is a flow diagram of the READ_VIN_A3 subroutine invoked by the program of FIG. 5A.
Figure 5J:
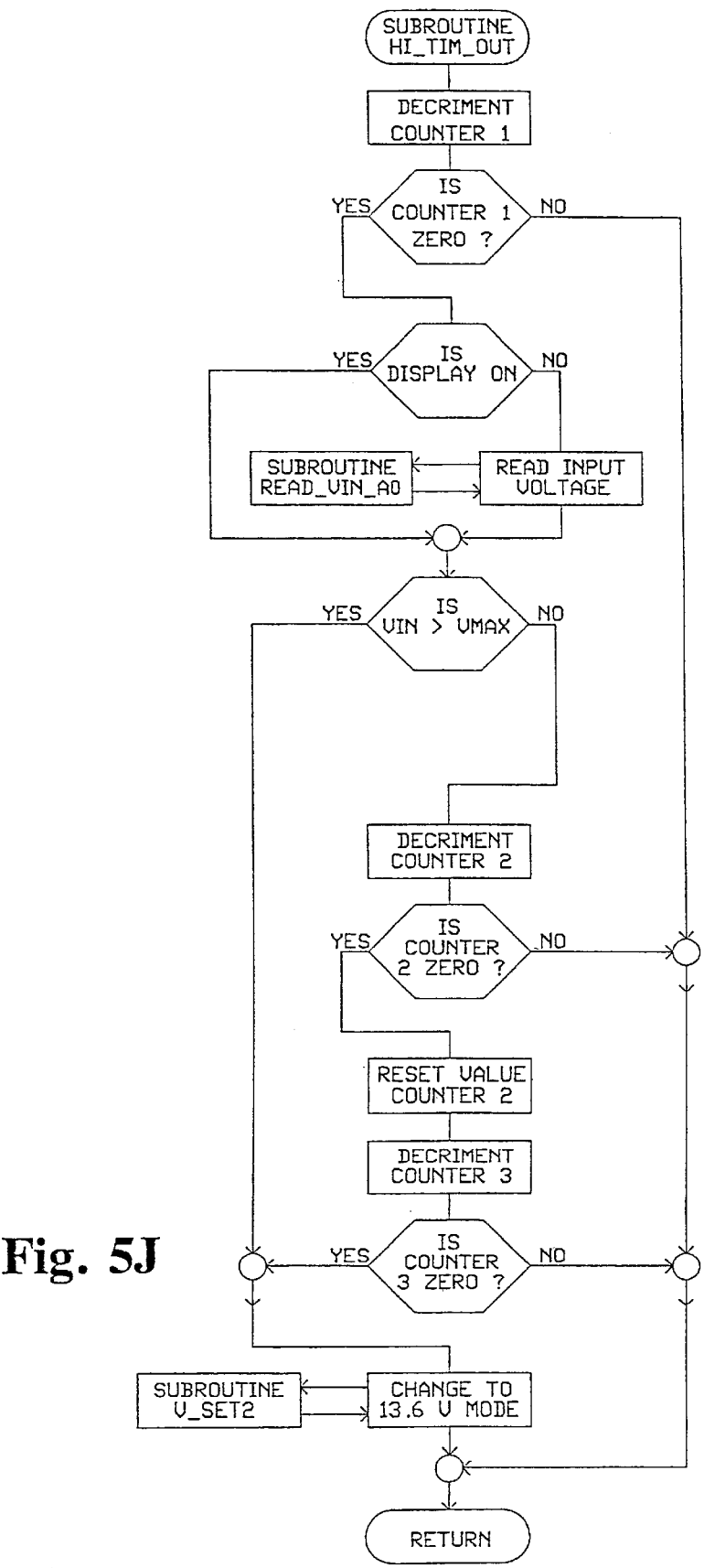
FIG. 5J is a flow diagram of the HI_TIM_OUT subroutine invoked by the program of FIG. 5A.

The steps of the SW_CHECK subroutine are illustrated in FIG. 5F. After initializing the system (132), the subroutine instructs the microcontroller to check whether the switch for Storage Mode (13.2 V) operation is engaged (134). Similar to the Boost Mode subroutine in the first embodiment, the program contains a delay (136) to ensure that the switch has completely debounced, i.e., to ensure that the program does not trigger merely on noise.

Next, subroutine SW_CHECK checks whether the 13.2 V switch has been activated long enough and, if it has, it asks whether the system is already in Storage Mode. If it is, the subroutine resets all the delay counters, and, if not already in 13.2 V mode, it will set the unit to this mode. Thereafter, the system will return to the main program. On the other hand, if the switch for Storage Mode has not been activated long enough, the subroutine will execute a control loop (140 in FIG. 5F) for the 13.6 V (Normal Mode) switch which cycles through the same series of steps to check the 13.2V switch. Finally, if the 13.6 V switch is not engaged, the subroutine enters a control loop to check the 14.4V (Boost Mode) switch. The control loop implemented to check the 14.4 V switch is identical to the SW_CHECK subroutine (FIG. 4D) described in the first embodiment.

Specifically, if the 14.4 V Boost Mode switch is not engaged, the program executes a series of steps as described in the first embodiment. However, unlike the first embodiment, once this branch of the control loop is complete, the program does not exit the subroutine but asks whether the on/off button is pushed (160 in FIG. 5F) in order to determine whether it should power up the LEDs or not (170 in FIG. 5F). If the on/off switch was activated, the program executes a series of steps to check whether the user has engaged the on/off switch again and thus reactivated the module. If it detects action, the program "wakes-up" the module and enters the loop shown in FIG. 5E to determine whether the display should be turned on or off.

If the on/off switch is not activated, the program first invokes a delay to ensure that it is not detecting an "off"

condition due to noise. If the switch is truly off, the "off ok" bit is set. Then, the program checks to see if it is in "Storage" Mode (not shown). The Storage Mode operates in the same manner as in the first embodiment. Note that when the on/off button is activated, the display will only stay on for a predetermined time. Therefore, the Storage Mode needs to be checked when the unit is off.

Notwithstanding the above, the subroutine LNG_TIM_OUT (shown in FIG. 5G) will be invoked after a predetermined time to turn the display off while the system is in the main program loop. For instance, if no manual switches have been engaged for 8 hours, the program will automatically turn the module display off.

Finally, the second embodiment incorporates a subroutine "CNVTR_ON" (FIG. 5H) to determine whether the power converter is on and, if so, to activate a "converter on" indicator. The operation of this subroutine is as follows. After executing preliminary initialization steps, the program reads the input voltage (READ_VIN_A3 shown in FIG. 5I) and then asks whether the input voltage is greater than a predetermined threshold voltage (Vc_Min). If it is, the converter is on and the subroutine instructs the module to activate LED10 (26' in FIG.3). If it is not, the subroutine deactivates the indicator, LED10. The program then exits subroutine "CNVTR_ON" and returns to the main program.

Overall, in addition to the "CNVTR_ON" subroutine, the main additions to this second embodiment not incorporated in the initial embodiment are the LED "display" subroutine (discussed in conjunction with FIG. 5A), the LED "test" subroutine (FIG. 5C) and the "display off" subroutine (FIG. 5E), as discussed above.

As indicated briefly at an earlier point, a simplified but useful way of shifting the output level of the converter to a specified level for a particular task is to merely use a plug-like device insertable directly into the TCMS interface receptacle provided at the converter, in the same general manner as the aforementioned module connector 20 of FIGS. 2 and 3. Such a plug-like device would desirably incorporate its own internal voltage level-setting circuitry, comparable to the analog circuit 24 for example, by which it would use the battery voltage as a supply and output a particular regulated or other type of signal derived therefrom directly back to the converter output-control Mode, instead of supplying the signal to a processor or the like as in the above-described embodiments. In this manner, the converter output could be directly and immediately changed to an entirely different level (e.g. 9.0 volts) needed for a particular application. Of course, removal of such a control "plug" would allow the converter to function in its usual manner, and would allow use of a microprocessor-type control module as described above.

Figure 3A:
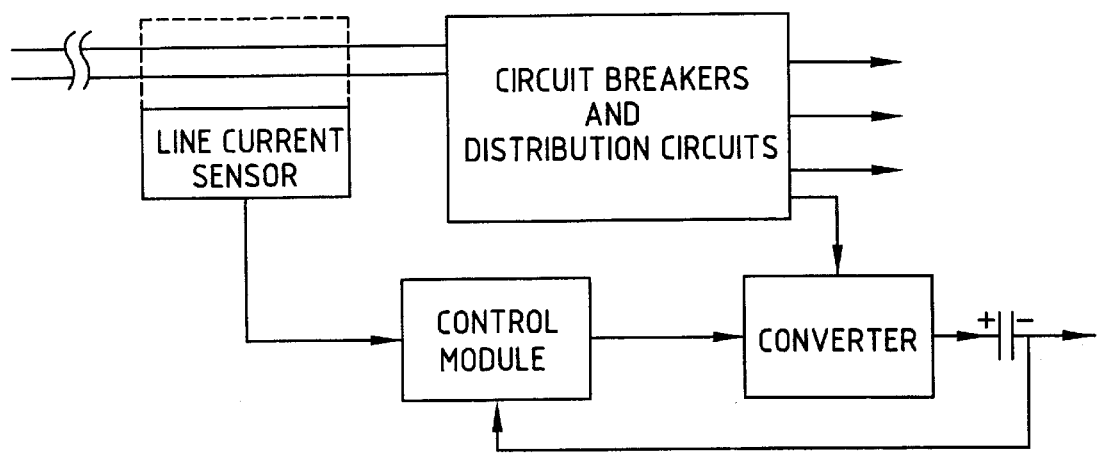
FIG. 3A is a block diagram illustrating the overall circuit configuration of still another embodiment of the invention.

Another feature and aspect of the invention is the automated, programmatic control of converter output level as a function of an external control parameter such as total line current draw by the recreational vehicle or other user facility served by the converter. A basic block diagram of such a control system as shown in FIG. 3A, and the implementation of such a system is well within the ordinary skill of the art practiced pursuant to this basic disclosure, particularly in contemplation of references such as U.S. Pat. No. 4,499,385. As will be apparent to those skilled in the art, the sensing of such line current may readily be done at or near the location of the converter, and accomplished indirectly, e.g., by use of an inductive sensor disposed in proximity to the supply line itself. Of course, the detection of supply line current magnitude may also be accomplished by direct connection to the line, e.g., at the circuit-breaker box into which the main supply line connects for further distribution to various user circuits, including the input supply to the converter. In either event, the determination of instantaneous line current magnitude may be readily accomplished, and a signal (e.g., analog voltage level or digital signal obtained by an A-to-D component) representative of such current magnitude may then be coupled to the control module for initiating corresponding changes in converter output. For example, upon detection of preselected high or maximum allowable levels of supply line current draw, the control module may, if desired, completely shutdown the converter to help avoid excessive line current draws.

It will be apparent to those skilled in the art upon due consideration of the foregoing description, along with the circuit schematics and programming flow charts depicted in the drawings, that the present invention provides a number of significant new features and improvements in the structure and function of voltage converters, particularly as utilized in recreational vehicles and the like to operate various appliances and to charge the associated coach batteries, based on an underlying concept of flexible, manual control features for the owner and operator together with overriding intelligent control of a number of associated parameters and operational features, by way of automated, microprocessor-implemented program routines and methodology.

Accordingly, it should be born in mind that the foregoing description of particular preferred embodiments merely sets forth a preferred example and contemplated best modes of implementing the underlying invention, and is not to be deemed a measure of the invention itself, whose scope is to be determined solely by consideration of the ensuing claims construed in accordance with established principles of patent law, including the Doctrine of Equivalents, and the particular terminology used throughout the description of preferred embodiments should be considered as representative rather than specific or limiting. For example, terms such as "program" and "processor" may mean a microprocessor or microcontroller as particularly disclosed in accordance with the preferred embodiment or any other essentially normal analogous device, including hardwired, fixed-program controllers or circuitry, etc. In addition, the term "charge state" as used in the claims or elsewhere also means "system voltage," i.e., battery output level summed with converter output, and terms such as "Boost," "Normal," "Trickle," etc., have a broader meaning than the specific examples given. Further, it should be noted that the manual switch function disclosed can if desired be used by itself in a simple, non-processor version of the invention.

The embodiments of the invention in which an exclusive property or privilege is claimed are defined as follows:

1. A remotely controllable electric power supply, comprising in combination:

an input for receiving operating power from a source;
   an output for supplying power to a load connected thereto at a desired voltage level different from that supplied to said input by said source;
   circuitry between said input and output for modifying and conditioning said operating power to produce said output power, said circuitry including a voltage-variable portion for changing the voltage level of said output in response to an applied control voltage indicative of an actual voltage of said load;
   an interface coupled to said voltage-variable circuitry portion to apply said control voltage thereto;

a command module coupled to said interface for providing said control voltage for application to said voltage-variable portion of said power supply circuitry to change said output level, said command module including a processor programmed to change said control voltage and thus said output voltage level as a function of at least certain predetermined parameters; and sensing circuitry for monitoring said certain parameters, including said actual voltage of said load, and transmitting signals representative thereof to said command module for use in changing said control voltage.

2. A remotely controllable power supply according to claim 1, wherein said interface communicates outwardly of and beyond the immediate location of said power supply to a different location, and said command module is at least partially located at said different location.

3. A remotely controllable power supply according to claim 1 including an analog interface device having passive circuitry to provide a predetermined voltage signal for setting the output of said supply at a desired level.

4. A remotely controllable power supply according to claim 3, wherein said passive circuitry is incorporated within a self-contained plug-in module.

5. A remotely controllable power supply according to claim 1, wherein said control module includes at least one manually actuatable switch for selectively initiating at least one predetermined change in said output level by the action of an operator.

6. A remotely controllable power supply according to claim 5, wherein said interface communicates outwardly of and beyond the immediate location of said power supply to a different location, and said command module and manually actuatable switch are at least partially located at said different location.

7. A remotely controllable power supply according to claim 6, wherein said control module further includes a visual display for indicating an instantaneous value of at least said output level.

8. A remotely controllable power supply according to claim 7, including sensing circuitry coupled to said load and to said command module to provide signals representative of said certain parameters, wherein said load includes a storage battery and said sensing circuitry includes components to determine the charge state of said battery, and wherein said visual display indicates a value of said battery charge state.

9. A remotely controllable power supply according to claim 5, wherein said processor is programmed to override said manually actuatable switch as a function of predetermined power supply output conditions.

10. A remotely controllable power supply accordingly to claim 9, wherein said predetermined output conditions include passage of a predetermined time interval at a predetermined output level.

11. A remotely controllable power supply according to claim 9, wherein said control module further includes a visual display for indicating an instantaneous value of at least said output level.

12. A remotely controllable power supply according to claim 11, including sensing circuitry coupled to said load and to said command module to provide signals representative of said certain parameters, wherein said load includes a storage battery and said sensing circuitry includes components to determine the charge state of said battery, and wherein said visual display indicates a value of said battery charge state.

13. A remotely controllable power supply according to claim 12, wherein said interface communicates outwardly of and beyond the immediate location of said power supply to a different location, and said command module is at least partially located at said different location.

14. A remotely controllable power supply according to claim 1, including sensing circuitry coupled to said load and to said command module to provide signals representative of said certain parameters, wherein said load includes a storage battery and said at least one detector includes circuitry and components to determine the charge state of said battery, and wherein said control module includes a visual display and said visual display indicates a value of said battery charge state.

15. A remotely controllable power supply according to claim 14, wherein said control module includes at least one manually actuatable switch for selectively initiating at least one predetermined change in said output level by the action of an operator.

16. A remotely controllable power supply according to claim 15, wherein said control module further includes a visual display for indicating an instantaneous value of at least said output level.

17. A remotely controllable power supply according to claim 16, wherein said processor is programmed to override said manually actuatable switch as a function of predetermined output level conditions.

18. A remotely controllable power supply according to claim 1, wherein said certain predetermined parameters include the magnitude of electrical current flow from said source providing operating power to said power supply and said sensing circuitry includes apparatus for monitoring said current flow magnitude.

19. A remotely controllable power supply according to claim 18, wherein said command module changes said control voltage to reduce said power supply output in response to said monitored current flow magnitude.

20. A remotely controllable power supply according to claim 18, wherein said command module changes said control voltage to vary said power supply output as a function of said monitored current flow magnitude.

21. A remotely controllable power supply according to claim 18, wherein said command module changes said control voltage to substantially interrupt said power supply output as a function of said monitored current flow magnitude at predetermined level.

22. A remotely controllable power supply according to claim 21, wherein said command module changes said control voltage to effectively turn said power supply output on and off as a function of said monitored current flow magnitude at a predetermined maximum level.

23. A remotely controllable power supply according to claim 1, wherein said sensing circuitry is coupled to said load and to said command module to provide signals representative of load excitation level.

24. A remotely controllable power supply according to claim 23 is furthered programmed to activate an LED when said power supply is on.

25. A remotely controllable power supply according to claim 23, wherein said load includes a storage battery and said sensing circuitry includes components to determine the charge state of said battery.

26. A remotely controllable power supply according to claim 25, wherein said command module processor is programmed to provide a plurality of differing output levels from said power supply to effect correspondingly different charge states for said storage battery as a function of predetermined operating criteria including said charge state determined by said sensing circuitry.

27. A remotely controllable power supply according to claim 26, wherein said differing output levels said processor is programmed to provide include a normal charge level, a trickle charge level of lower magnitude than said normal level, and a boost charge level which is of greater magnitude than said normal level.

28. A remotely controllable power supply according to claim 27, wherein said processor is programmed to automatically change said Normal, Boost and Trickle output levels from one to another thereof as a function of at least said charge state determined by said sensing circuitry.

29. A remotely controllable power supply according to claim 28, wherein said battery is connected to and provides operating power for a user system and said processor is programmed to produce said boost output level in response to detection of a predetermined low level of said user system operating voltage.

30. A remotely controllable power supply according to claim 29, wherein said processor is programmed to discontinue said boost output level upon detection of user system operating voltage levels exceeding said predetermined low level and at least equal to said normal level.

31. A remotely controllable power supply according to claim 29, wherein said processor is programmed to discontinue said Boost output level upon detection of user system operating voltage levels exceeding said Normal level but less than said Boost level.

32. A remotely controllable power supply according to claim 29, wherein said processor is programmed to discontinue said boost output level upon passage of a predetermined length of time.

33. A remotely controllable power supply according to claim 29, wherein said processor is programmed to discontinue said boost output level upon either detection of user system operating voltage levels exceeding said predetermined low level and at least equal to said normal level or upon passage of a predetermined length of time, whichever occurs first.

34. A remotely controllable power supply according to claim 26, wherein said processor is also programmed to include time as a determinant used in automatically changing said differing output levels from one to another.

35. A remotely controllable power supply according to claim 34, wherein said processor is programmed to automatically initiate a Storage Mode by a reduced output level when said charge state determined by said sensing circuitry has not varied from a predetermined value during a predetermined interval of elapsed time.

36. A remotely controllable power supply according to claim 35, wherein said processor is further programmed to automatically discontinue said Storage Mode by increasing said output level upon sensed change in the existing charge state of said storage battery.

37. A remotely controllable power supply according to claim 36, wherein said processor is further programmed to discontinue said Storage Mode by initially changing said reduced output level to an elevated output level which exceeds the charge levels used during normal operation.

38. A remotely controllable power supply according to claim 37, wherein said processor is further programmed to automatically discontinue said elevated output level after a predetermined interval of elapsed time.

39. A remotely controllable power supply according to claim 38, wherein said processor is further programmed to automatically initiate said normal charge output level upon discontinuation of said elevated level following said predetermined time interval.

40. A control system for use with an electric power converter having an output voltage whose magnitude is a function of internal converter circuitry which includes a signal-responsive circuit portion operative to selectively change the output voltage of said electric power converter from a first value to any of a plurality of different second values comprising:

an interface electrically connected to said signal-responsive circuit portion and physically communicating externally of said power converter, for receiving a control signal from an external source and applying such signal to said signal-responsive circuit portion;

a control module located externally of said converter and adapted to be coupled to said interface to apply a control signal indicative of an actual voltage of a load to said interface corresponding to a selected particular different such second value output voltage, said control signal applied by said interface to said signal-responsive circuit portion to thereby change the output of said converter from said first value to said selected different second value from said location external to said converter.

41. A control system for a power converter according to claim 40 wherein said control module includes an analog device having passive circuitry to provide a predetermined output as said control signal for setting the output of said converter at a predetermined desired level.

42. A control system for a power converter according to claim 41, wherein said control module comprises at least in part a self-contained plug-in module and said interface includes a port into which said module may be plugged, whereby said passive circuitry is made interconnectable with said power converter circuit.

43. The control system of claim 40 wherein said control module comprises:

a first analog circuit for conditioning a signal input;

a second analog circuit for providing said control signal at a preselected level;

a connecting means for transmitting said control signal from said module to said power converter by said interface;

a processor for executing a control program stored in memory and supplying a signal representative of a predetermined mode of operation;

a clock for providing timing signals to said processor;

a switch connected to said processor for manually controlling the output voltage of said power converter; and a display for signaling converter output.

44. The control system of claim 43 wherein said processor further comprises:

a Boost subroutine to execute a control program stored in memory which increases charging voltage of said power converter;

a Storage subroutine to execute a control program stored in memory which controls sleep mode operation of said power converter;

a timer subroutine to execute a control program stored in memory which returns said power to Normal Mode operation.

a status subroutine to execute a control program stored in memory which operates an LED to indicate the on/off status of said converter.

45. The control system of claim 43 wherein said control module includes:

a series of switches for manually controlling the converter output voltage;

a series of LED's coupled to said switches for identifying and displaying information regarding converter mode of operation.

46. The control system of claim 45 wherein the processor further comprises:
a switch check subroutine to execute a control program stored in memory which cycles through Sleep, Normal, and Boost Modes of operation;
a storage subroutine to execute a control program stored in memory which controls sleep mode operation of the power converter;
A LED test subroutine to execute a control program stored in memory which identifies problems;
a long time-out subroutine to execute a control program stored in memory which deactivates the system if it has been inactive for a predetermined time; and
a display subroutine to execute a control program stored in memory which controls the LEDs used to signal mode of operation.

47. A control system for a power converter according to claim 41, wherein said control module comprises a selectively variable device for selectively changing said control signal and thereby selecting another and different output level for said converter.

48. A control system for a power converter according to claim 42, wherein said control module comprises one of a plurality of selectively interchangeable such plug-in modules, each such module having circuitry to provide a different such control signal for correspondingly varying said converter output.

49. A remotely controllable electric power supply, comprising in combination:
an input for receiving operating power from a source;
an output for supplying power to a load connected thereto at a desired voltage level different from that supplied to said input by said source;
circuitry between said input and output for modifying and conditioning said operating power to produce said output power, said circuitry including a voltage-variable portion for changing the voltage level of said output in response to an applied control voltage indicative of an actual voltage of said load;
an interface coupled to said voltage-variable circuitry portion to apply said control voltage thereto;
a command module coupled to said interface for providing said control voltage for application to said voltage-variable portion of said power supply circuitry to change said output level, said command module including circuitry to change said control voltage and thus said output voltage level as a function of at least certain predetermined parameters; and
sensing circuitry for monitoring said certain parameters, including said actual voltage of said load, and transmitting signals representative thereof to said command module for use in changing said control voltage.

* * * * *